(12) United States Patent
Nagata et al.

(10) Patent No.: US 6,239,421 B1
(45) Date of Patent: May 29, 2001

(54) ROD LENS ARRAY AND IMAGE READ APPARATUS AND SYSTEM USING THE SAME

(75) Inventors: Kenji Nagata, Kawasaki; Tatsundo Kawai, Hadano; Masami Tabata, Isehara, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/097,277

(22) Filed: Jun. 12, 1998

(30) Foreign Application Priority Data

Jun. 24, 1997 (JP) .................................................. 9-167234

(51) Int. Cl.$^7$ ...................................................... H04N 1/04
(52) U.S. Cl. ............................. 250/208.1; 362/581; 355/1
(58) Field of Search ........................... 250/208.1, 227.11, 250/227, 2; 382/34, 116, 120, 901; 362/551, 554, 556, 559, 581; 355/1

(56) References Cited

U.S. PATENT DOCUMENTS

| | | | |
|---|---|---|---|
| 4,696,552 | | 9/1987 | Hattori et al. . |
| 5,081,346 | * | 1/1992 | Narabu et al. ..................... 250/208.1 |
| 5,254,847 | * | 10/1993 | Hata et al. ......................... 250/208.1 |
| 5,331,146 | * | 7/1994 | Tanimizu ........................... 250/208.1 |
| 5,661,540 | * | 8/1997 | Kaihotsu et al. ........................ 355/1 |

FOREIGN PATENT DOCUMENTS

| | | |
|---|---|---|
| 0 408 072 A2 | 1/1991 | (EP) . |
| 0 508 709 A2 | 10/1992 | (EP) . |
| 0 557 891 A1 | 9/1993 | (EP) . |
| 0 596 664 A1 | 5/1994 | (EP) . |

\* cited by examiner

Primary Examiner—John R. Lee
(74) Attorney, Agent, or Firm—Morgan&Finnegan, LLP

(57) ABSTRACT

A rod lens array, used in an image sensor, is configured by sandwiching a plurality of rod lenses with two side plates. Among the two side plates, the one which is on the side of the illumination device is made thinner than the other side plate.

24 Claims, 25 Drawing Sheets

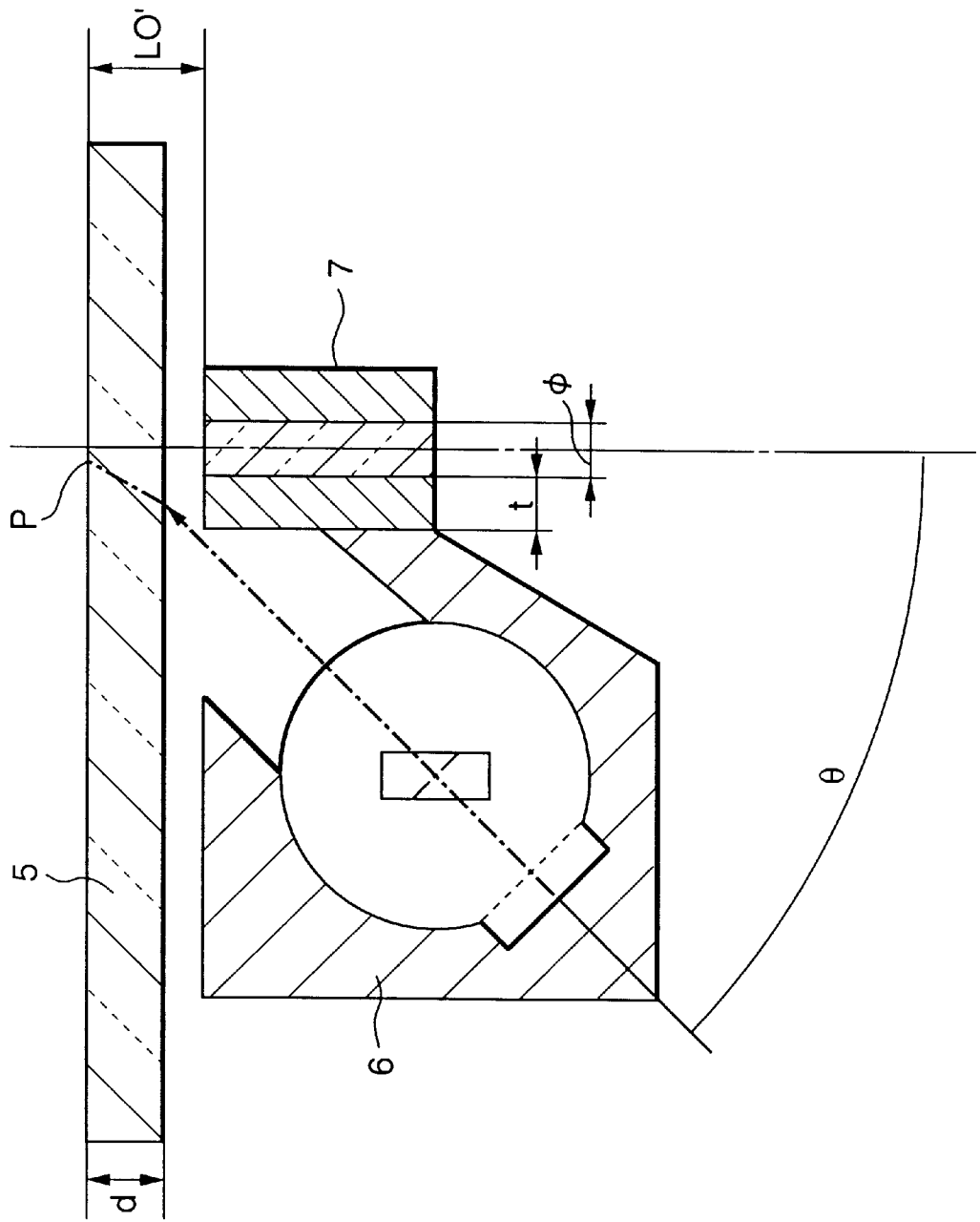

ROD LENS ARRAY AND IMAGE READ APPARATUS AND SYSTEM USING THE SAME

BACKGROUND OF THE INVENTION

The present invention relates to a rod lens array, and image read apparatus and image read system using the rod lens array.

With the recent rapid spread of personal computers, there exists demand for a system for reading an image, such as a photograph and an illustration, using an information processing apparatus for image input purpose, called scanner, processing the read image on a computer, and printing the processed image on a postcard or other document. When using the scanner in a residence, a setting space, utilization convenience, and the appearance of the scanner are important. Accordingly, a small and light-weight scanner is demanded.

As an example achieving down-sizing and down-weighing, there is a scanner using a contact type image sensor, as an image read unit, for reading an original image upon contacting the original image. FIG. 15 is an external perspective view of a conventional contact type image sensor. In FIG. 15, reference numeral 1 denotes a frame for supporting the entire image sensor; and 5, a cover glass for determining a reading surface upon contacting an original image. The frame 1 includes many photodetectors arranged along the length (in the direction of an arrow DM) of the frame 1 as a sensor array. Here, the direction of the arrow DM is denoted as the main scanning direction and the widthwise direction (direction of an arrow DS which is perpendicular to the direction DM) of the frame 1 is denoted as the sub-scanning direction.

FIG. 16 is a cross-sectional view taken along a line B–B' in FIG. 15. A rod lens array 7, as an image forming device, is arranged in a first space 1A, and an illumination device 6 is set in a second space 1B. The first and second spaces 1A and 1B are connected. The illumination device 6 comprises a light guide 61 having the function of guiding the light, emitted from one or more LED light sources 63, in the main scanning direction DM and illuminating an original image 500 by reflecting the guided light on a reflection surface 64 toward the original image 500, and a housing 62, or a frame, having the function for preventing light from leaking from the light guide 61 and fixing the position of the light guide plate 61 so that the original image 500 is effectively illuminated. The light emitted from the above light source 6 illuminates the original image 500 on a cover glass 5, and the rod lens array 7 and a sensor substrate 4, which is arranged in a third space 1C, are arranged so that the reflected light from the original image forms an image on a sensor IC 3 on the sensor substrate 4.

The foregoing image sensor is assembled in such manner that the illumination device 6 is fixed on a clamp face 1D of the frame 1 by adhesive or screws, and the rod lens array 7 is inserted into the first space 1A and fixed on a clamp face 1E of the frame 1 by adhesive or screws. Then, the sensor substrate 4 on which the sensor IC 3 is mounted is fixed on the frame 1 via a frame 2. Thereby, the image sensor is assembled.

The rod lens array 7 is formed in such manner, as shown in FIG. 17, that a plurality of rod lenses 71 are arranged in one or more lines, sandwiched by thin supporting plates, or side plates, 72 and 73, and the spaces between the rod lenses 71 and the supporting plates 72 or 73 are filled with resin to fix the positions of the rod lenses 71.

Each rod lens 71 is made by gradually decreasing index of refraction from the peripheral portion toward the central portion. The diameter of the rod lens 71 is about 0.6 mm, and the thickness of the side plates 72 and 73 is about 0.5 mm. The rod lens array 7 has characteristics of forming an image of the original image 500 on the object plane of the same size on the image plane. Therefore, the rod lens array 7 is suitable for forming an image of an original image on the sensor surface to read the image when the original image is placed on the object plane and photodetection surface is arranged on the image plane.

FIG. 18 shows relationship between the rod lens array 7, an object plane 74, and an image plane 75. The distance between the object plane 74 and the image plane 75 depends upon the characteristics of each rod lens, and is called "conjugate distance" (TC). Further, the distance between the end of the lens and the object plane 74 or the image plane 75 is called "working distance" (L0). Further, the distance denoted by Z0 is the length of each rod lens forming the rod lens array 7, or the height of the rod lens array 7.

As for the rod lens array 7 mainly used in this type of the image sensor, there are two types of lens arrays; those having the conjugate distance TC of 9 mm and those having the conjugate distance TC of 18 mm. When down-sizing is given priority, an image sensor of the former type is used; whereas, when resolution and depth of focus are given priority, an image sensor of the latter type is used. Below, an image sensor using a rod lens array whose conjugate distance TC is 9.1 mm is explained.

FIG. 19 is an image sensor using a rod lens array 7 whose conjugate distance TC is 9.1 mm, and FIG. 20 shows position relationship between the rod lens array 7, the illumination device 6, the cover glass 5, and the sensor substrate 4. Note, the illumination device 6 has a plurality of LED chips arranged in a line on a substrate. The height Z0 of the rod lens array 7 is 4.3 mm, and the distance from the end of the rod lens array 7 to the surface of the sensor IC 3 corresponds to the working distance L0, and it is 2.4 mm. Further, the distance L0' from the end of the rod lens array 7 to the original image 500 is slightly larger than the working distance L0, since there is the cover glass 5 of the thickness d of 1 mm having the index of refraction of about 1.5 between the end of the rod lens array 7 and the original image 500, and the distance L0' is 2.7 mm. Therefore, the distance from the original 500 to the sensor IC 3 is 9.4 mm, which is slightly longer then the conjugate distance TC of the rod lens array 7, and the thickness of the image sensor is about 11 mm including the thickness of the sensor substrate 4.

In order to make the best use of the advantage of the above contact type image sensor to realize a compact image sensor and further minimize the image sensor, utilization of an image forming device having a shorter conjugate distance TC than the above is proposed.

The conjugate distance TC of a rod lens array is known to be determined by the following equations;

$$TC = Z0 + 2 \times L0 \quad L0 = -1/(n0 \times \sqrt{A}) \times \tan(Z0 \times \pi/P) \quad P = 2 \times \pi/\sqrt{A} \quad (1)$$

In the above equations (1), A denotes a distributed constant of the index of refraction of each rod lens, n0 denotes the index of refraction of each rod lens on the optical axis, Z0 denotes the length of each rod lens, P denotes wavelength, and L0 denotes the working distance.

As a method for shortening the conjugate distance TC expressed by the above equations (1), there is a method for slightly increasing the length of the each rod lens forming the rod lens array 7, or the height Z0 of the rod lens array 7. For example, in the rod lens array having the conjugate distance TC of 9.1 mm as shown in FIG. 20, the value of the variables are:

n0=1.639

√A=0.8637

Z0=4.3 mm

Among the above values, with n0 and √A fixed, Z0 is slightly increased to 4.5 mm, and the conjugate distance TC becomes 8.1 mm according to the above equations (1).

FIG. 21 shows a lens array 7 having the height Z0 of 4.5 mm and the conjugate distance TC of 8.1 mm. With this configuration, it is possible to shorten the conjugate distance TC without changing distribution of index of refraction of the rod lenses. In this method, however, the length of the rod lenses, or the height Z0 of the rod lens array is lengthened, and there is a limitation for shortening the conjugate distance TC.

Accordingly, it is impossible to realize the conjugate distance TC of a desirable short length.

Accordingly, as another method for shortening the conjugate distance TC, there is a method of changing the distribution of index of refraction in each rod lens so that the index of refraction from the peripheral portion toward the central portion decreases more rapidly than before. Namely, among the aforesaid constants n0, √A and Z0, √A is changed.

FIG. 22 is a cross-sectional view of a lens array having different distributed constant. As shown in FIG. 22, since paths of incoming light in each rod lens bend largely within the rod lens, the conjugate distance TC is shortened. In this method, while shortening the conjugate distance TC, the height of the rod lens array Z0 is also shortened. The rod lens array 7 in FIG. 22 has the conjugate distance TC of 4.7 mm, and the height Z0 of 2.1 mm, and the distance L0 between the end of the rod lens array 7 and the surface of the sensor IC 3 is 1.3 mm. The distance L0' between the other end of the rod lens array 7 and the original image is 1.6 mm, which is slightly longer than the distance L0, since there is the cover glass 5 of 1 mm thickness having the index of refraction of 1.5.

An image sensor adopting such rod lenses having a short conjugate distance TC is shown in FIG. 23. As shown in FIG. 23, by fixing the cover glass 5 to the frame 1 while pressing the illumination device 6 inserted in the second space 1B and the rod lens array 7 inserted in the first space 1A against the frame 1 by the cover glass 5, to the frame 1, the light source 6 and the rod lens array 7 are simultaneously fixed. Further, the sensor substrate 4 on which the sensor IC 3 is formed is fixed to the frame 1 by adhesive or screws or by caulking the frame 1. By configuring the image sensor as described above, the thickness of the image sensor is further thinned. Note, in FIG. 23, TC' is a conjugate distance, however, since there is a cover glass 5 instead of atmosphere, the distance TC' is different from the conjugate distance TC expressed by the equations (1). Specifically, TC' is the sum of Z0, L0, and L0'.

FIG. 24 shows relationship between the rod lens array 7 having the conjugate distance TC of 9.1 mm and light emitted from the illumination device 6. The light emitted from the illumination device 6 travels the space between the end of the rod lens array 7 and the original 500 (L0'=2.7 mm) diagonally, and illuminates a focal position of the rod lens array on the original, the read point P. Practically, it is designed to illuminate an area around the point P by ±0.2 mm in the sub-scanning direction to cope with tolerance of mechanical configuration. Generally, the illumination device 6 illuminates the original images at an angle between 30 and 50 degrees with respect to the optical axis of the lens array 7.

FIG. 25 shows relationship between the rod lens array 7 having the conjugate distance TC of 4.7 mm, about half the height of the rod lens array shown in FIG. 24, and illuminating light. The light emitted from the illumination device 6 travels the space between the end of the rod lens array 7 and the original image 500 (L0'=1.6 mm) diagonally. Since the working distance L0 between the end of the lens array 7, having a short conjugate length TC, and the focal point is short, it is necessary to place the illumination device 6 near the lens array 7 as much as possible. However, due to the thickness of the housing of the illuminating device 6, it may not be possible to illuminate the point P even though the illumination device 6 is placed at the closest position to the lens array 7. Thus, when an image sensor is configured using a lens array having a short conjugate distance TC, there would be a problem in which an original image may not be read effectively since the illuminating light can not illuminate the point P with enough brightness.

Further, in a case where the rod lens array 7 is placed at some distance from the cover glass 5, it is necessary to provide light shielding member so as to prevent direct light from the illumination device 6, internal reflected light, and stray light from outside of the contact type image sensor from entering the rod lens array 7. However, the shielding member makes it even harder to illuminate the focal point by the light source when a rod lens array of a short conjugate distance is used.

SUMMARY OF THE INVENTION

The present invention has been made in consideration of the above situation, and has as its object to provide a thin and small rod lens array which enables an illumination device to illuminate focal points of the rod lens array, and image read apparatus and system using the rod lens array.

According to the present invention, the foregoing object is attained by providing a rod lens array, used in an image read apparatus having an illumination device for illuminating an original image and a linear image sensor for converting reflected light from the original image into image signals and outputting the image signals, for forming the reflected light on the linear image sensor, comprising: a plurality of rod lenses; and first and second side plates for fixing positions of the rod lenses by sandwiching the rod lenses on both sides, wherein thickness of the first and second side plates differ from each other.

Further, the foregoing object is also attained by providing an image read apparatus comprising: an illumination device for illuminating an original image; a linear image sensor for converting reflected light from the original image into image signals and outputting the image signals; and a rod lens array configured with a plurality of rod lenses, sandwiched by first and second side plates, having different thickness from each other, on both sides, for forming the reflected light on the linear image sensor.

Furthermore, the foregoing object is also attained by providing an image read system comprising: a reading unit having: an illumination device for illuminating an original image; a linear image sensor for converting reflected light from the original image into image signals and outputting the image signals; and a rod lens array configured with a plurality of rod lenses, sandwiched, parallel to the light path, by first and second side plates, having different thickness from each other, for forming the reflected light on the linear image sensor, and signal processing means for applying predetermined processes on the image signals outputted from the linear image sensor.

Preferably, the thickness of said first side plate is thinner than the thickness of said second side plate when the illumination device is placed on the side of said first side plate.

Further, the foregoing object is also attained by providing a rod lens array, used in an image read apparatus having an illumination device for illuminating an original image and a linear image sensor for converting reflected light from the original image into image signals and outputting the image signals, for forming the reflected light on the linear image sensor, comprising: a plurality of rod lenses; and a side plate for fixing positions of the rod lenses, wherein the rod lenses, arranged in an array, are fixed on only one side of the side plate.

Furthermore, the foregoing object is also attained by providing an image read apparatus comprising: an illumination device for illuminating an original image; a linear image sensor for converting reflected light from the original image into image signals and outputting the image signals; and a rod lens array configured with a plurality of rod lenses, supported by a side plate from one side, for forming the reflected light on the linear image sensor.

Further, the foregoing object is also attained by providing an image read system comprising: a reading unit having: an illumination device for illuminating an original image; a linear image sensor for converting reflected light from the original image into image signals and outputting the image signals; and a rod lens array configured with a plurality of rod lenses, supported by a side plate from one side, for forming the reflected light on the linear image sensor, and signal processing means for applying predetermined processes on the image signals outputted from the linear image sensor.

With the aforesaid configuration, the strength of the rod lens array is retained.

Further, the foregoing object is also attained by providing rod lens array, used in an image read apparatus having an illumination device for illuminating an original image and a linear image sensor for converting reflected light from the original image into image signals and outputting the image signals, for forming the reflected light on the linear image sensor, comprising: a plurality of rod lenses; and side plates for setting positions of the rod lenses, wherein a diameter $\phi$[mm] of each of the rod lenses and the thickness t [mm] of the side plates are determined so as to satisfy $\phi/2+t \leq 0.5$ [mm].

Furthermore, the foregoing object is also attained by providing an image read apparatus comprising: a transparent member which determines a reading position on an original image; an illumination device for illuminating the original image; a linear image sensor for converting reflected light from the original image into image signals and outputting the image signals; and a rod lens array configured with a plurality of rod lenses, sandwiched by side plates, for forming the reflected light on the linear image sensor, wherein, when a shortest distance between an edge of the rod lens array and the original image is L0 [mm], then a diameter $\phi$[mm] of each of the rod lenses, thickness t [mm] of the side plates, an index of refraction n of the transparent member, thickness d [mm] of the transparent plate, and an incident angle $\theta$ of light emitted by the illumination device on the transparent member are determined so as to satisfy $\phi/2+t \leq d \times \tan(\arcsin((\sin \theta)/n))+(L0-d) \times \tan \theta - 0.2$[mm].

Further, the foregoing object is also attained by providing an image read system comprising: a reading unit having: a transparent member which determines a reading position on an original image; an illumination device for illuminating the original image; a linear image sensor for converting reflected light from the original image into image signals and outputting the image signals; and a rod lens array configured with a plurality of rod lenses, sandwiched by side plates, for forming the reflected light on the linear image sensor, and signal processing means for applying predetermined processes on the image signals outputted from the linear image sensor, wherein, when a shortest distance between an edge of the rod lens array and the original image is L0 [mm], then a diameter $\phi$ [mm] of each of the rod lenses, thickness t [mm] of the side plates, an index of refraction n of the transparent member, thickness d [mm] of the transparent plate, and an incident angle $\theta$ of light emitted by the illumination device on the transparent member are determined so as to satisfy $\phi/2+t \leq d \times \tan(\arcsin((\sin \theta)/n))+(L0-d) \times \tan \theta - 0.2$[mm].

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 25 shows relationship between a conventional lens array, having a short conjugate distance, and light emitted by an illumination device.

DETAILED DESCRIPTION OF THE PREFERRED EMBODIMENTS

Preferred embodiments of the present invention will be described in detail in accordance with the accompanying drawings.

<First Embodiment>

Figure 1:
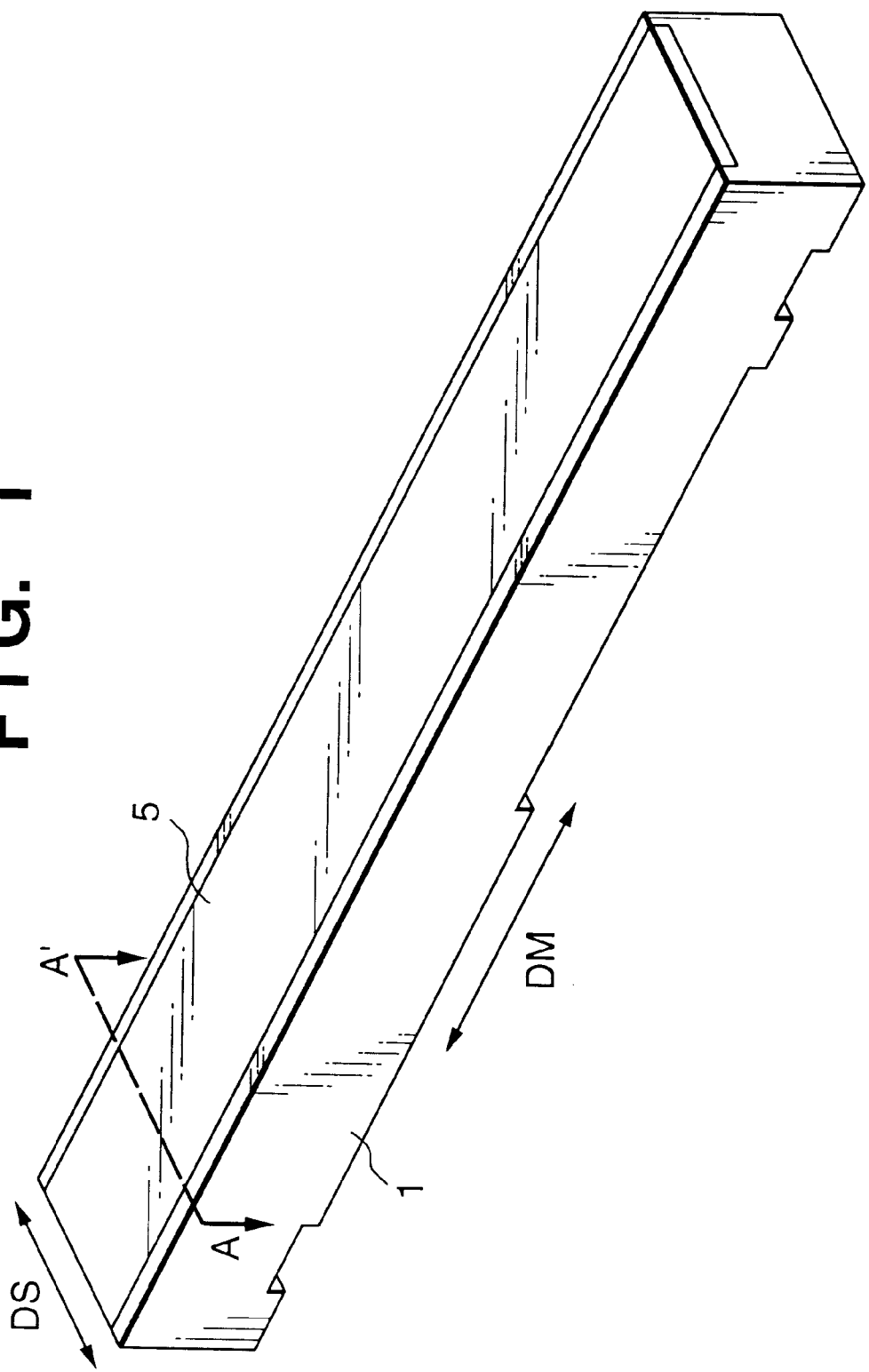
FIG. 1 is an external perspective view of a contact type image sensor according to an embodiment of the present invention.
Figure 2:
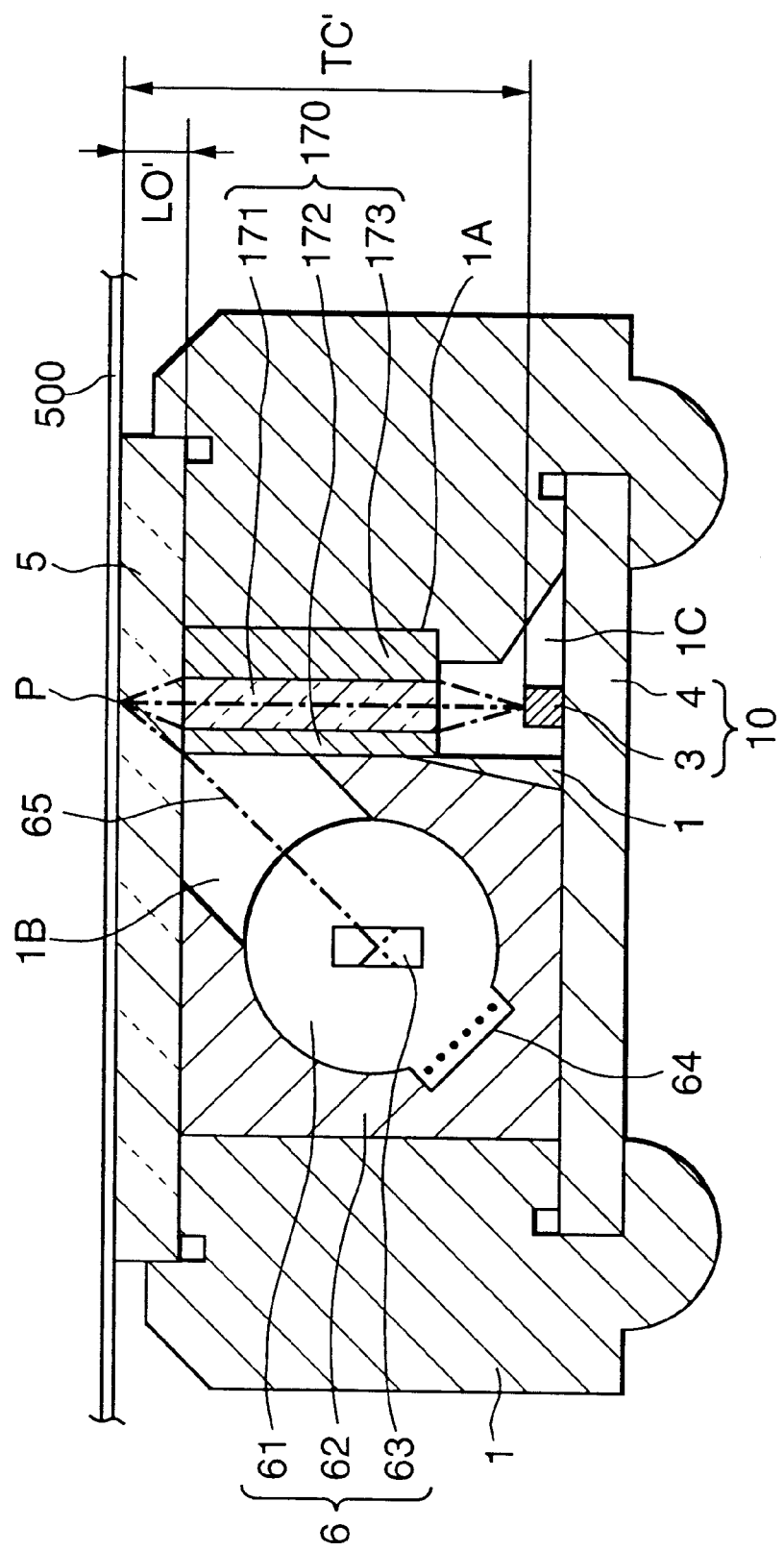
FIG. 2 is a cross-sectional view of a contact type image sensor according to a first embodiment of the present invention.
Figure 15:
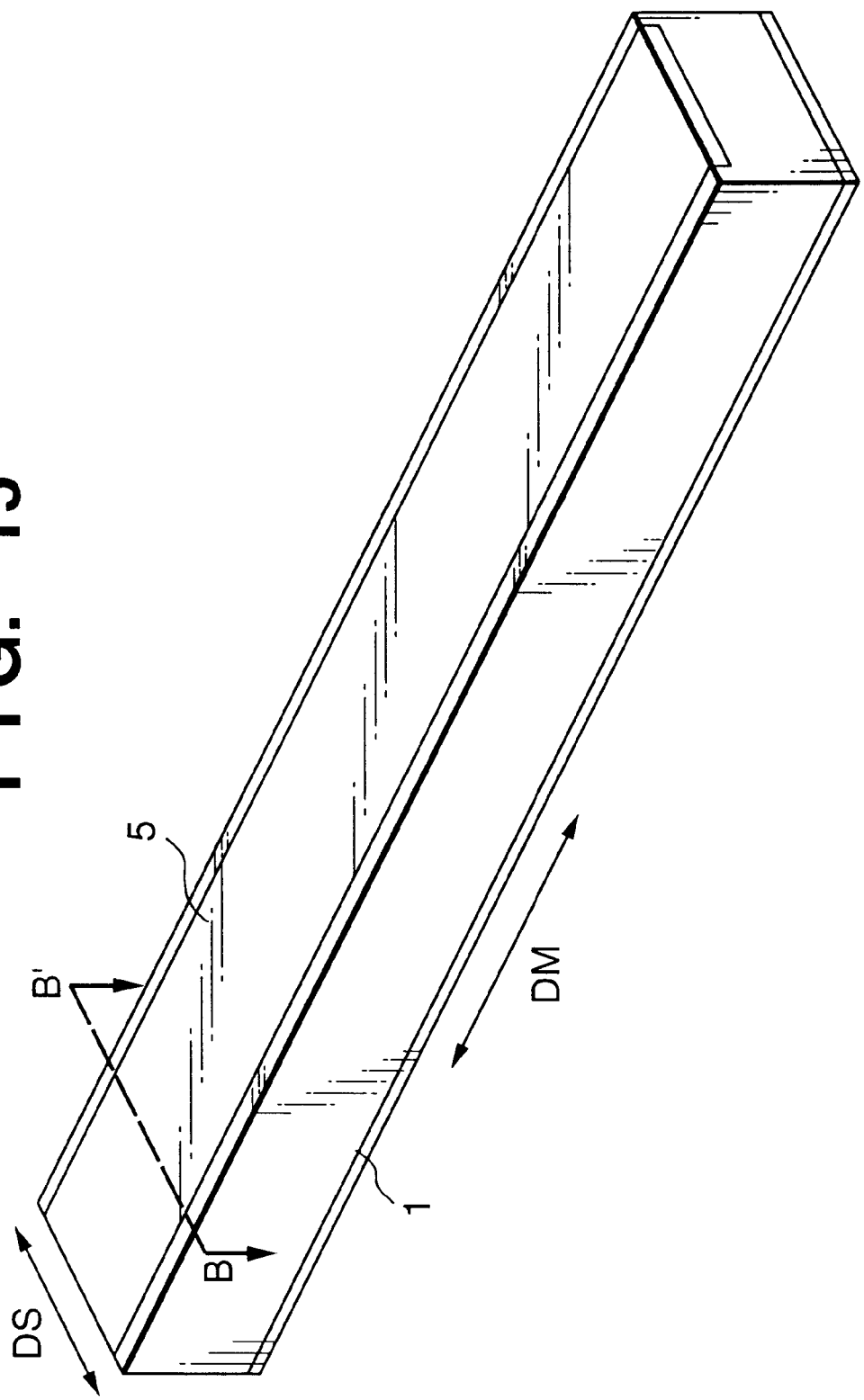
FIG. 15 is an external perspective view of a conventional contact type image sensor.
Figure 16:
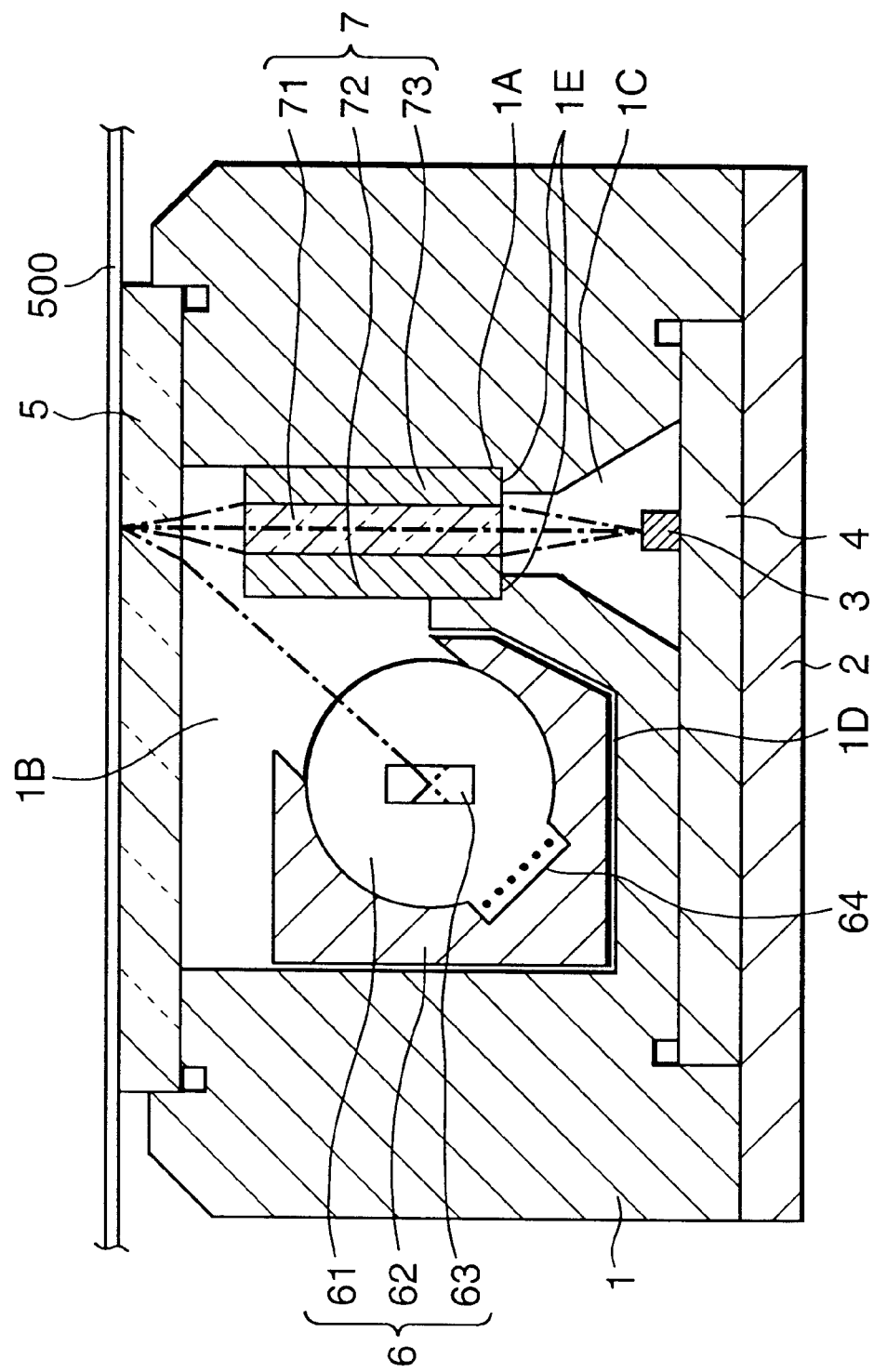
FIG. 16 is a cross sectional view of the conventional image sensor.
Figure 17:
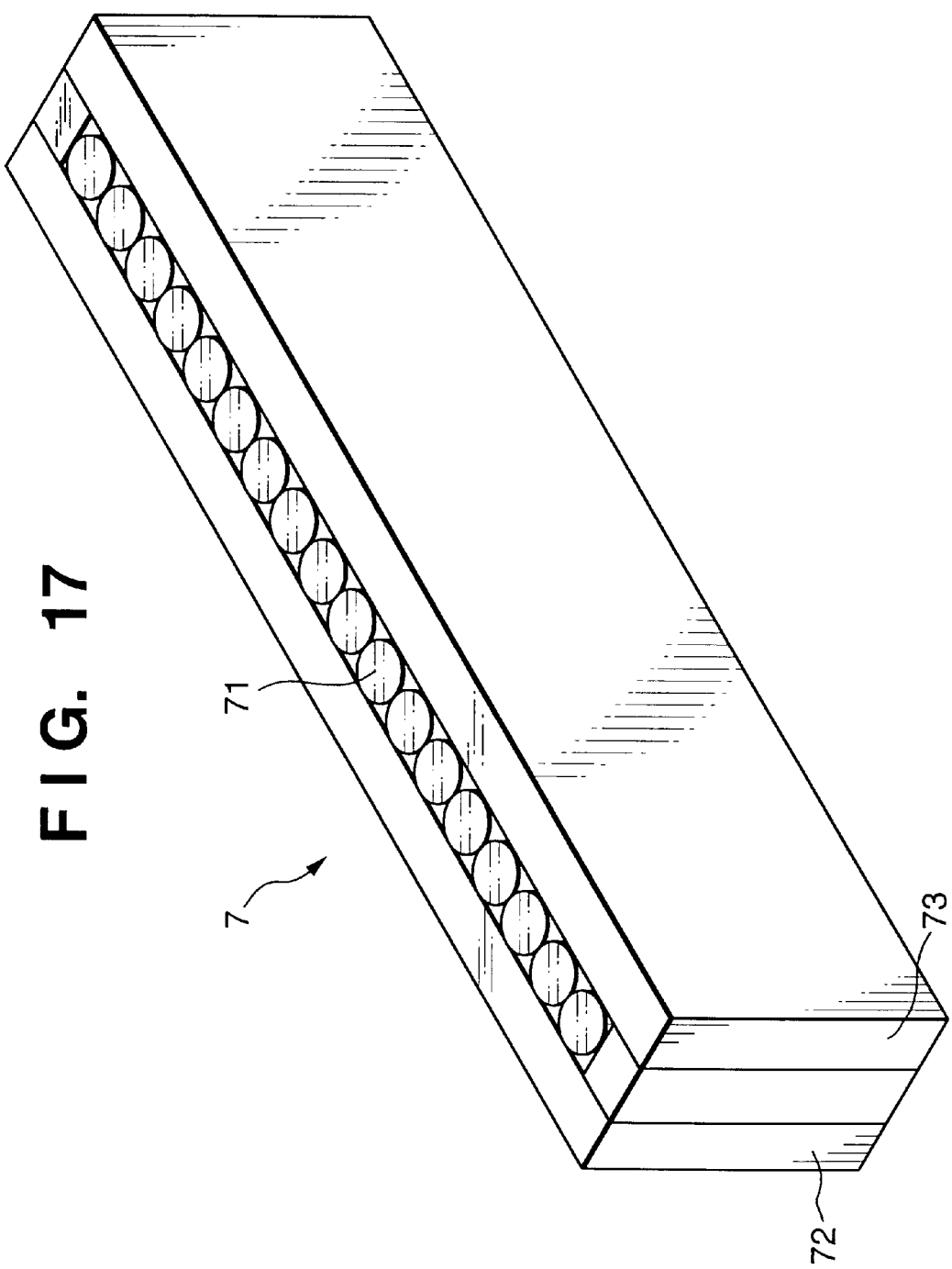
FIG. 17 is a perspective view of a conventional rod lens array.
Figure 18:
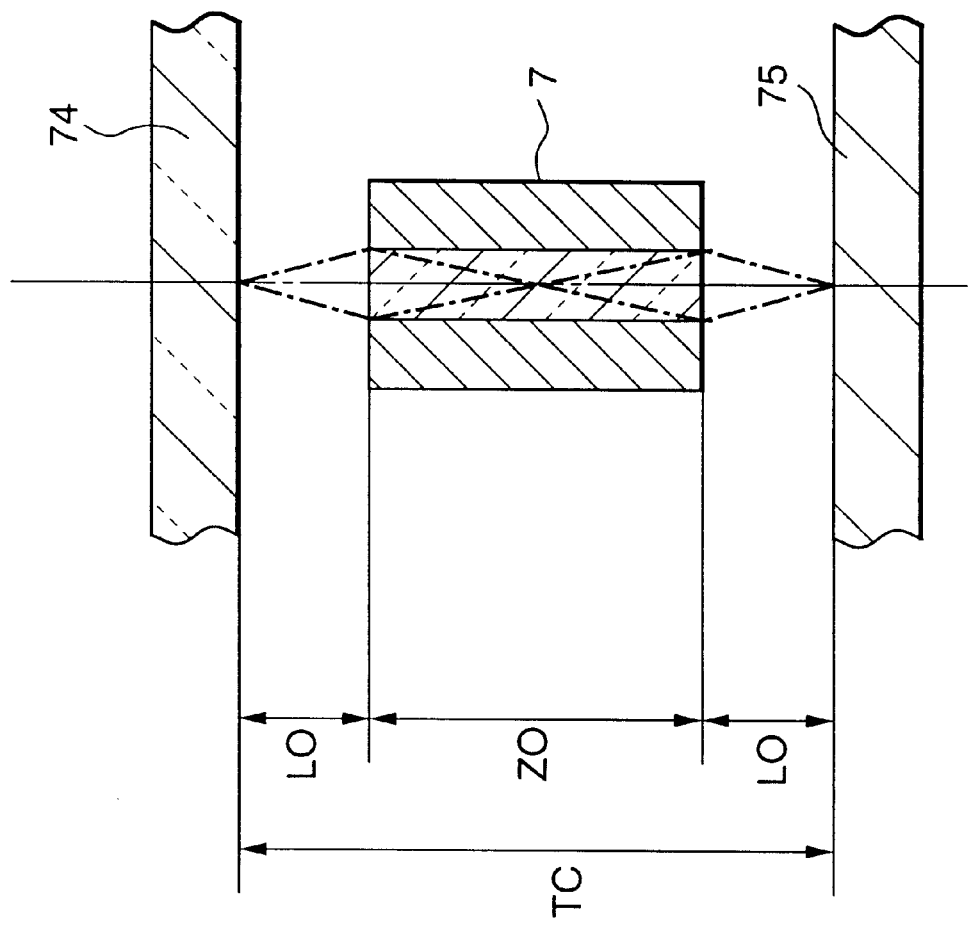
FIG. 18 shows characteristics of the conventional rod lens array.
Figure 19:
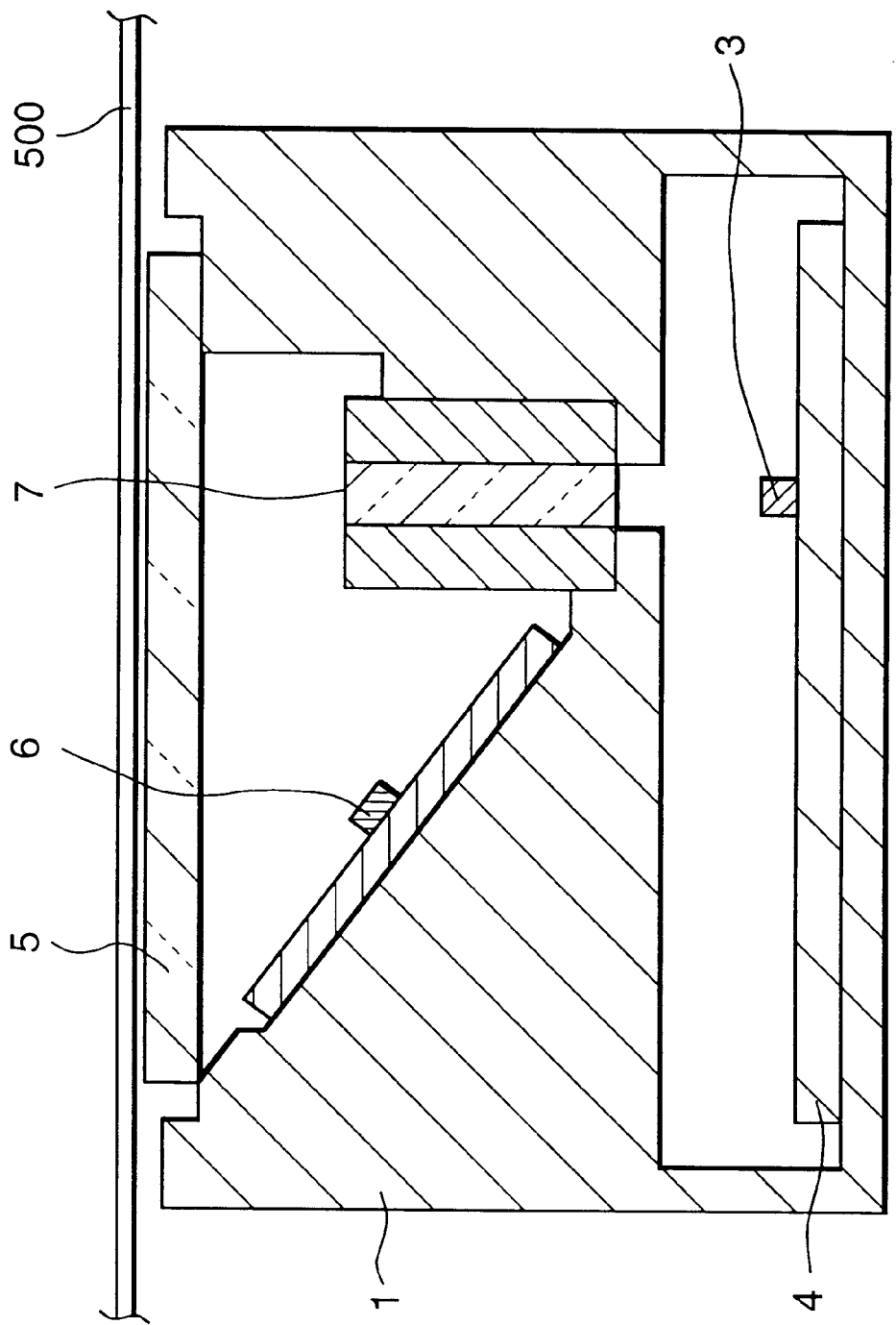
FIG. 19 is a cross sectional view of a conventional contact type image sensor.
Figure 20:
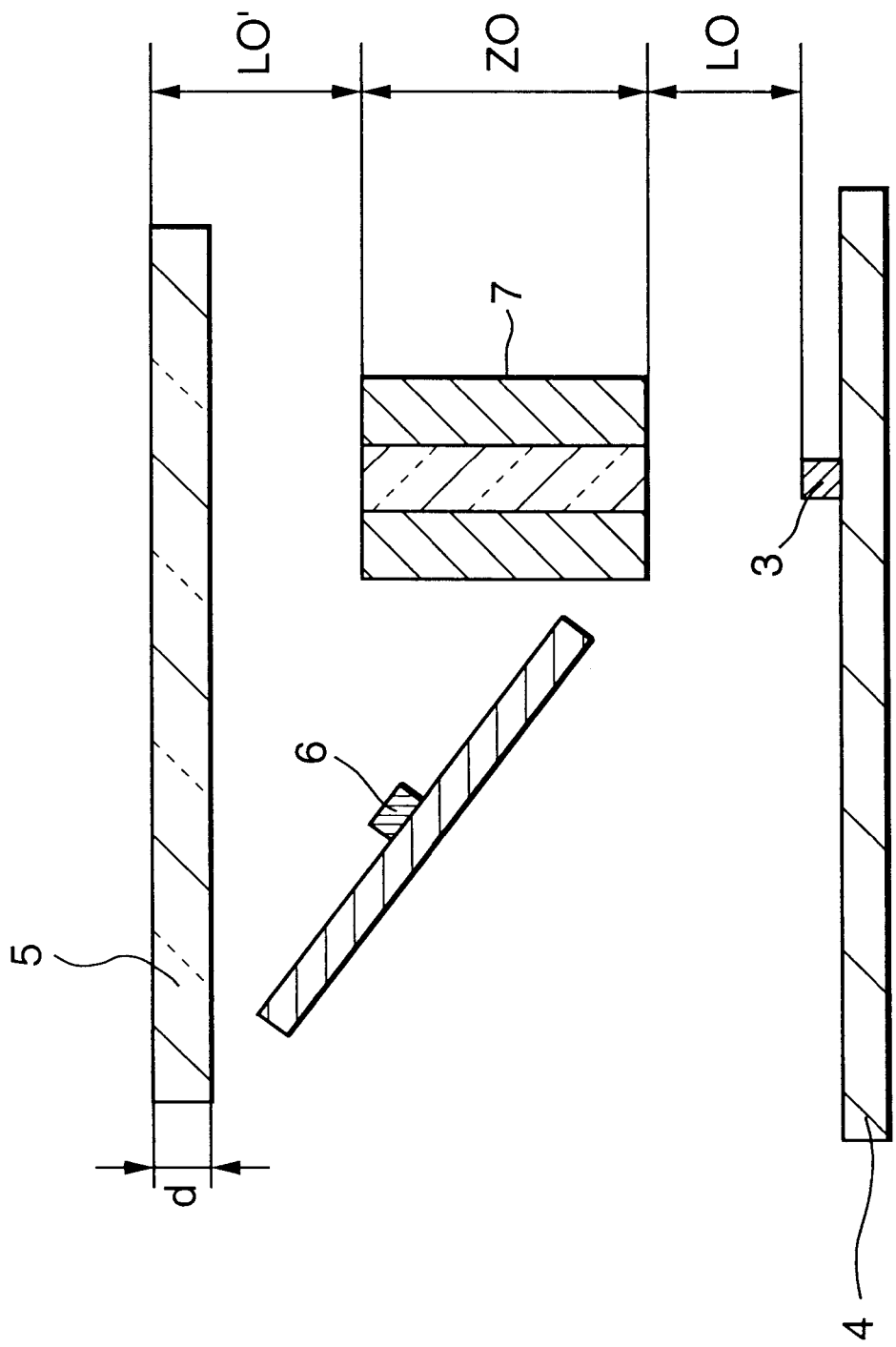
FIG. 20 shows a conventional lens array and its vicinity.
Figure 21:
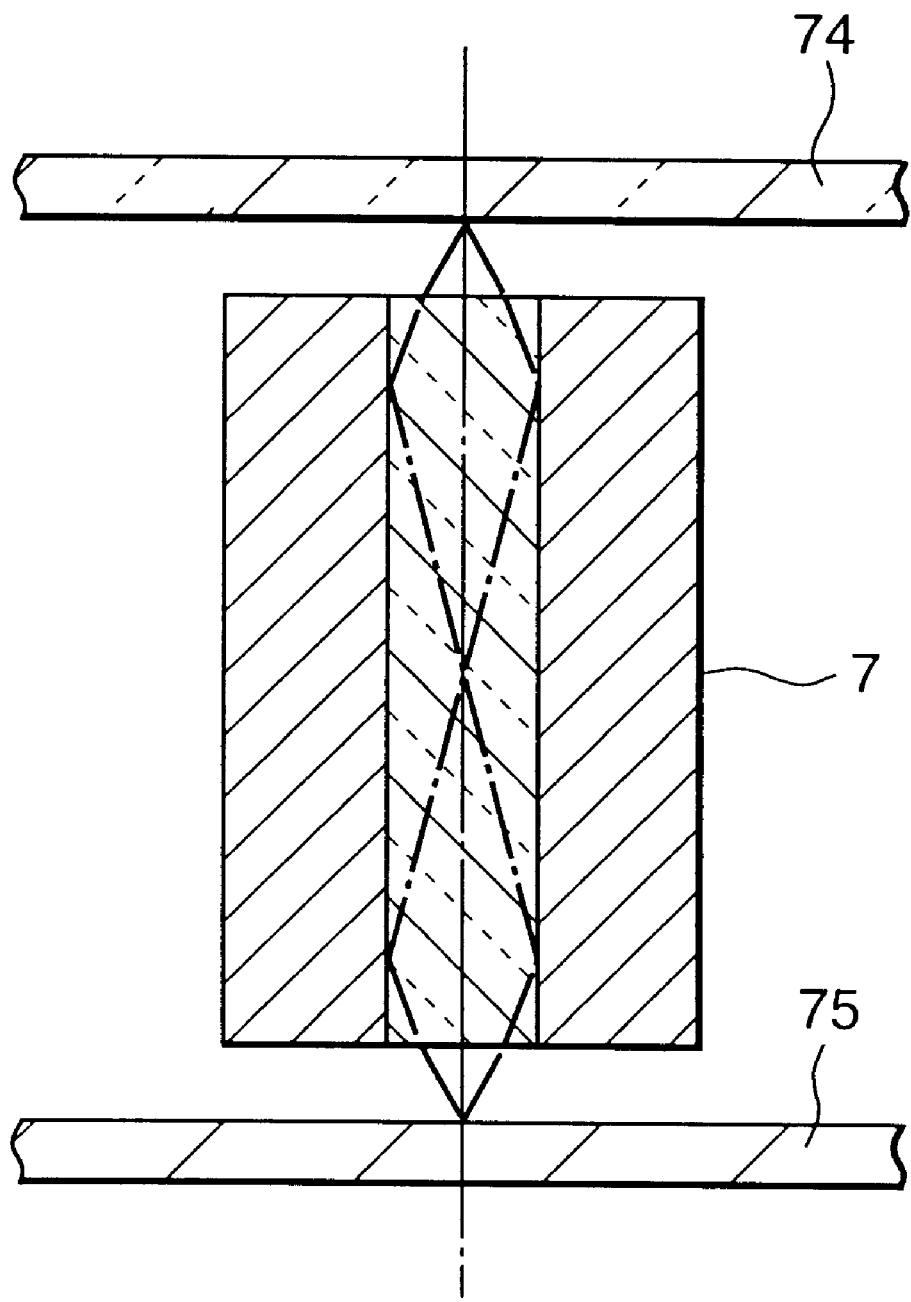
FIG. 21 shows a lens array having a short conjugate distance.
Figure 22:
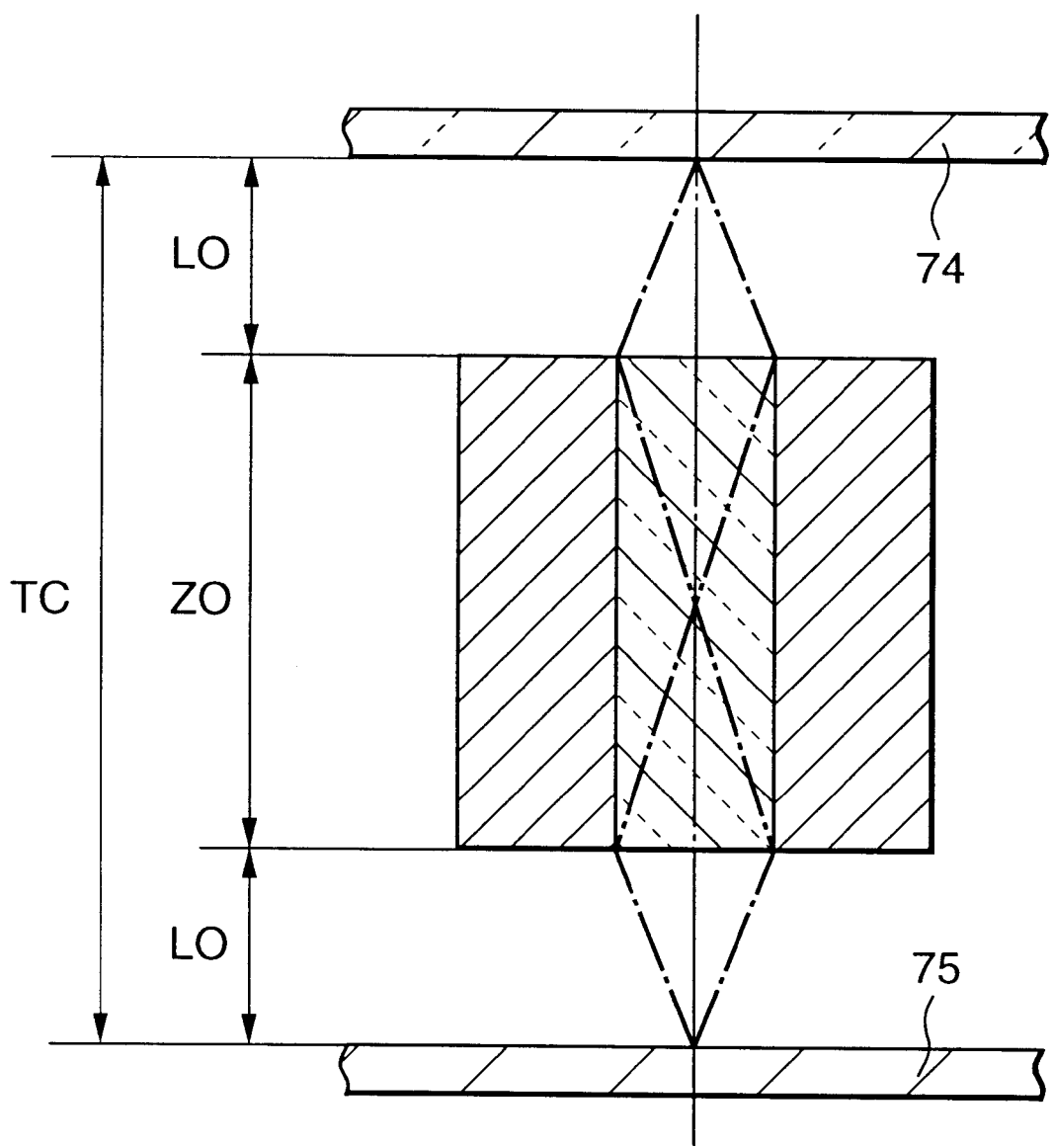
FIG. 22 shows another lens array having a short conjugate distance.
Figure 23:
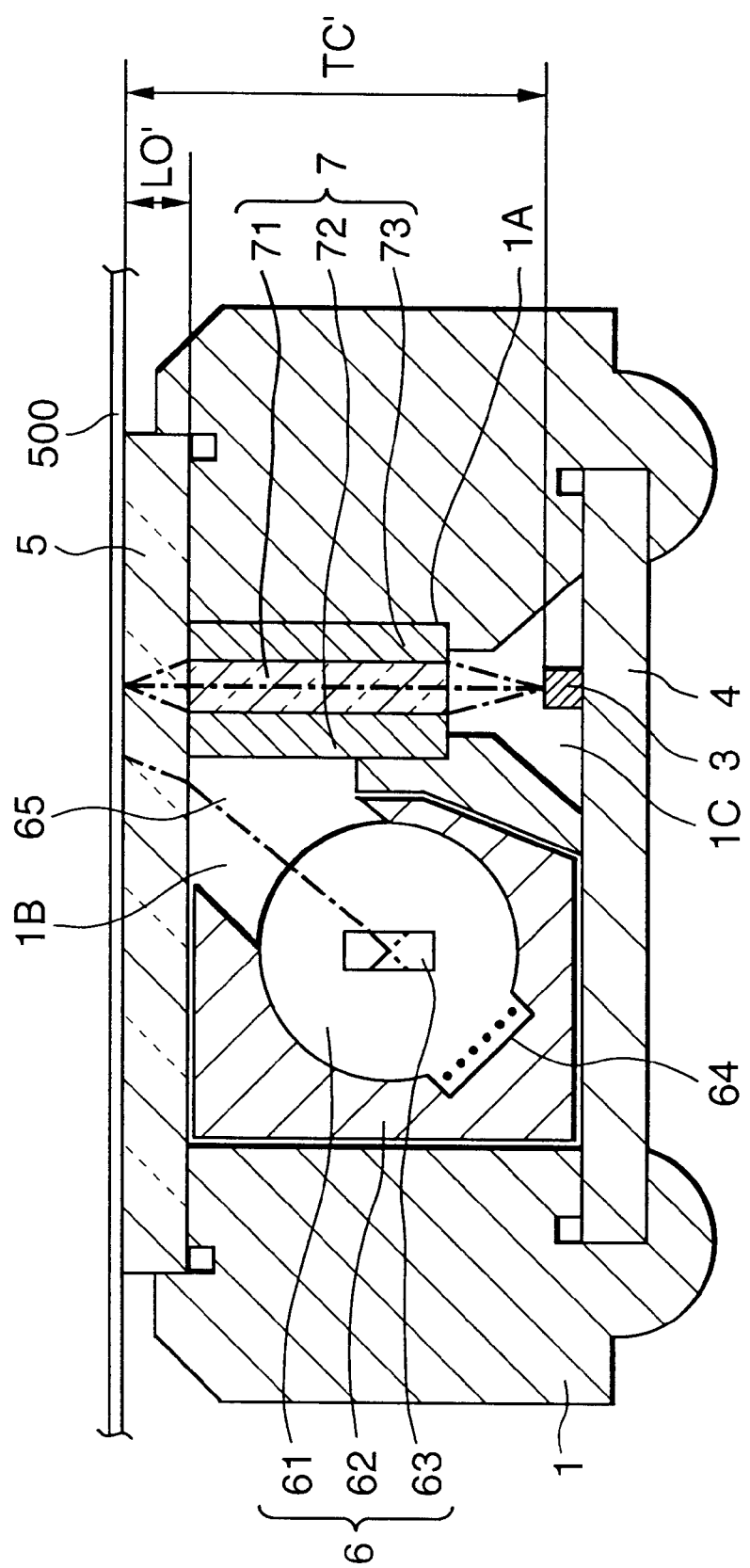
FIG. 23 is a cross sectional view of a contact type image sensor using a lens array having a short conjugate distance.
Figure 24:
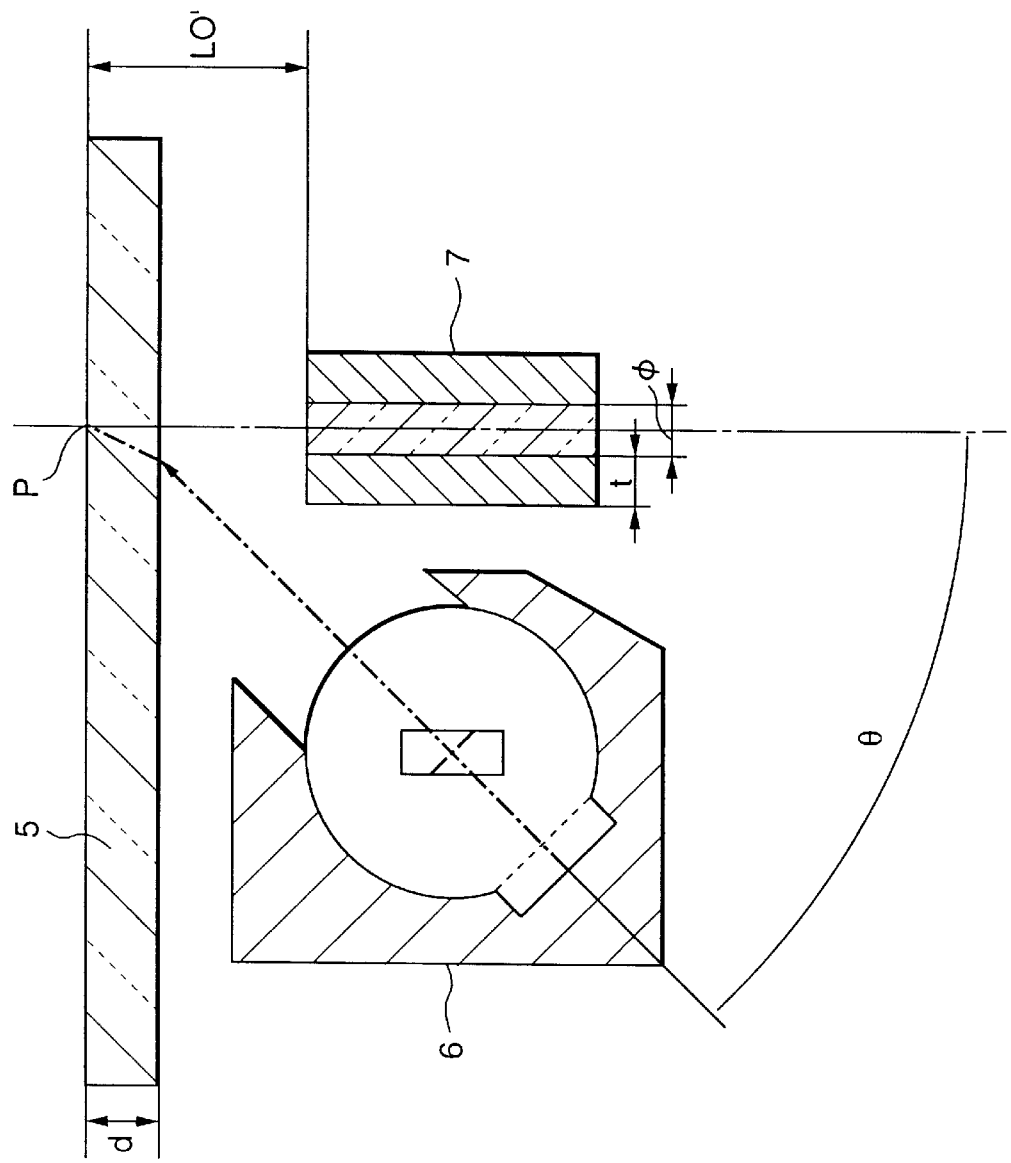
FIG. 24 shows relationship between a conventional lens array and light emitted by an illumination device.

FIG. 1 is an external perspective view of a contact type image sensor, used as a reading unit, of the present invention, and FIG. 2 is a cross-sectional view taken along a line A–A' in FIG. 1. Note, the same elements as described in reference to FIGS. 15 and 16 are referred by the same reference numerals.

In FIG. 1, reference numeral 1 denotes a frame as a supporting member; and 5, a cover glass, made of transparent material, for determining a reading surface upon contacting an original image. Further, in FIG. 2, reference numeral 6 denotes an illumination device for illuminating an original image 500. The illumination device 6 comprises a light guide 61 having the function of guiding light, emitted from one or more LED light sources 63, in the main scanning direction DM and illuminating an original image 500 by reflecting the guided light on a reflection surface 64 toward the original image 500, and a housing 62, or a frame, having the function for preventing light from leaking from the light guide 61 and fixing the position of the light guide plat 61 so that the original image 500 is effectively illuminated.

Reference numeral 170 denotes a rod lens array for forming an image by light projected by the original image 500 which is illuminated by the illumination device 6. The rod lens array 170 is formed with a plurality of rod lenses 171 and side plates 172 and 173 for supporting the rod lenses 171 arranged in an array of one or more rows. The rod lenses 171 and the side plates 172 and 173 are fixed by adhesive, such as resin. Further, an image formed by the rod lenses 171 with light reflected by the original 500 is photo-electric converted to electric signals by a sensor IC 3. A plurality of sensor ICs 3 are precisely arranged in a line of the desired width on a sensor substrate 4 made of, e.g., a glass epoxy material, thereby forming a linear image sensor 10. Further, the sensor substrate 4 is electrically connected to an image read apparatus.

In the image sensor according to the first embodiment, the thickness of the first side plate 172, configuring the rod lens array 170 and arranged on the side of illumination device 6, is made thinner than that of the second side plate 173 arranged in the opposite side of the rod lens 171. With this configuration, the illumination device 6 is mounted near the rod lens 171, and light 65 emitted by the illumination device 6 illuminates the read point P on the original image 500, namely, a focal point of the rod lens 171. However, as the thickness of the side plate 172 is made thinner, strength of the rod lens array 170 decreases. This may cause difficulties to precisely set the optical positions of the illumination device 6 and the rod lens array 170 supported by the frame 1. In order to overcome this problem, the thickness of the side plate 173 may be increased. In this manner, the side plate 172 on the side of the illumination device 6 is made thinner without weakening the strength of the rod lens array 170.

By configuring as described above, when optically setting the rod lens array by making the side plate 172 of the rod lens array 170 contact with the frame 1, pressing the rod lens array 170 against the frame 1 by the cover glass 5, and fixing the cover glass 5 to the frame 1, the optical position of the lens array 170 is set and fixed, simply and precisely, since the rod lens array 170 of the first embodiment has necessary strength. Further, by making the lens array 170 contact with the frame 1, direct light from the illumination device 6, internal reflected light, and stray light from outside of the contact type image sensor are prevented from affecting the sensor IC 3.

<Second Embodiment>

Figure 3:
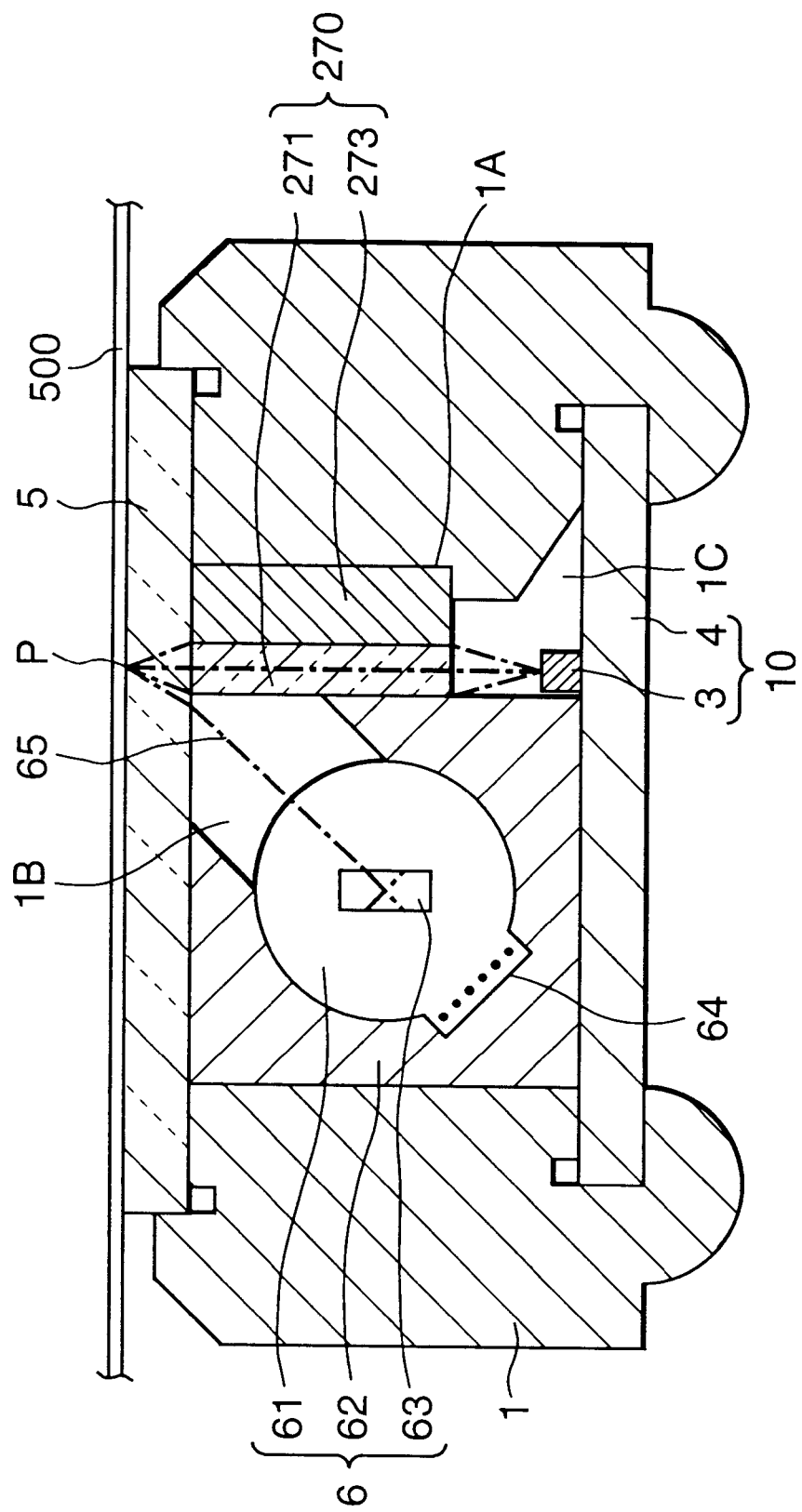
FIG. 3 is a cross-sectional view of a contact type image sensor according to a second embodiment of the present invention.

FIG. 3 is a cross-sectional view of a contact type image sensor according to the second embodiment. In the second embodiment, the side plate of a rod lens array 270 on the side of illumination device 6 is omitted, and the rod lens array 270 is supported only by a side plate 273. The side plate 273 and rod lenses 271 are fixed by adhesive, such as resin. With the above configuration, the illumination device 6 can be placed next to the rod lens 271.

Further, half the side surface of the rod lens array 6 is revealed by omitting the side plate on the side of the illumination device 6, and the revealed side surface, such as half of the side surfaces of the rod lenses 271, a painted surface, and resin, as adhesive, for forming the lens array 6, is in contact with the surface of the housing 62 of the illumination device 6. With this configuration, stray light caused by direct light from the illumination device 6, internal reflected light, and stray light from outside of the contact type image sensor are prevented from affecting the sensor IC 3.

<Third Embodiment>

Figure 4:
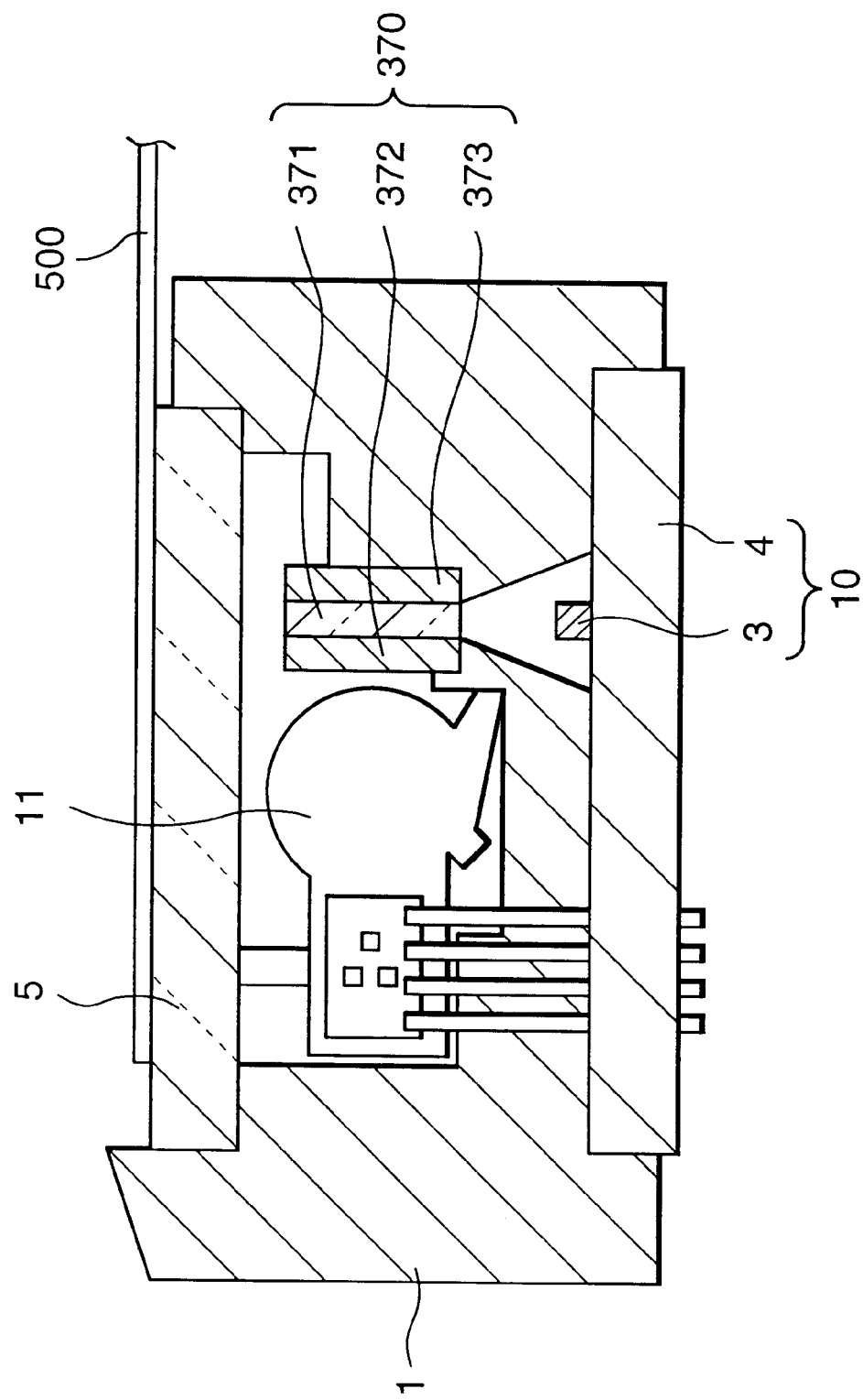
FIG. 4 is a cross-sectional view of a contact type image sensor according to a third embodiment of the present invention.
Figure 5:
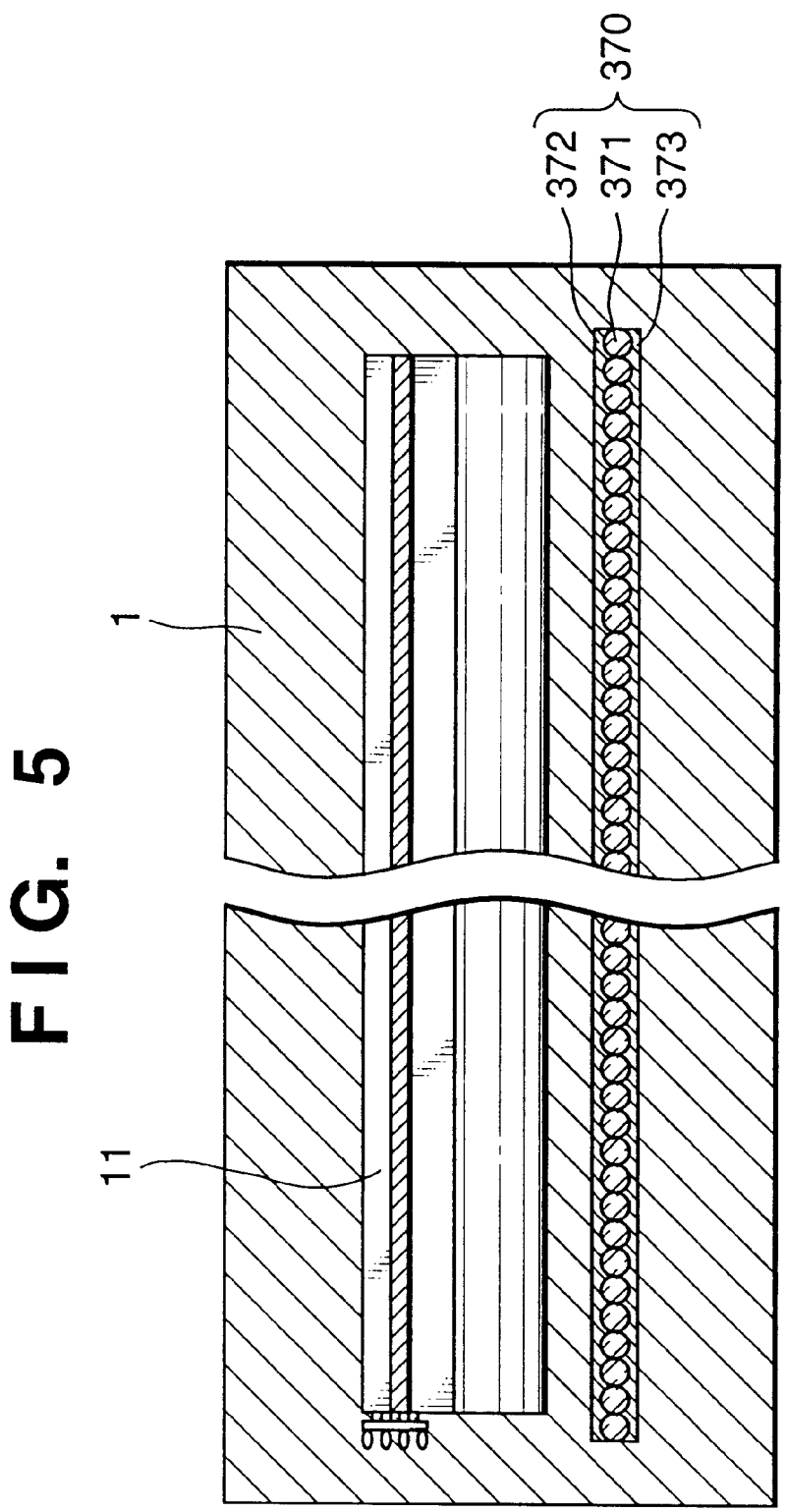
FIG. 5 is a top view of the contact type image sensor according to the third embodiment of the present invention.

FIG. 4 is a cross-sectional view of a contact type image sensor according to the third embodiment, and FIG. 5 is a top view of the image sensor.

As shown in FIGS. 4 and 5, the image sensor according to the third embodiment comprises a linear image sensor 10, including a plurality of the sensor ICs 3, having a plurality of photodetectors arranged in a line, precisely arranged in a line of the desired width on the sensor substrate 4 made of, e.g., glass epoxy material, a rod lens array 370, an illumination device 11, the cover glass 5, made of transparent material, for holding an original, and the frame 1, made of, e.g., aluminum or resin, such as polycarbonate, for setting the positions of the foregoing elements and supporting them.

In the image sensor having the above configuration, an original image held by being pressed against the cover glass 5 by a roller (not shown), for instance, is sequentially illuminated by light of three colors, i.e., red (R), green (G) and blue (B), by the illumination device 11 from the diagonal direction. Then, the R, G and B light reflected by the original image forms an image on the sensor ICs 3 via the rod lens array 370, and the sensor ICs 3 convert the formed image into electric signals. The converted electric signals, or image signals, are transmitted to a system where the R, G and B image signals are processed to reproduce a color image as will be described later.

Figure 6:
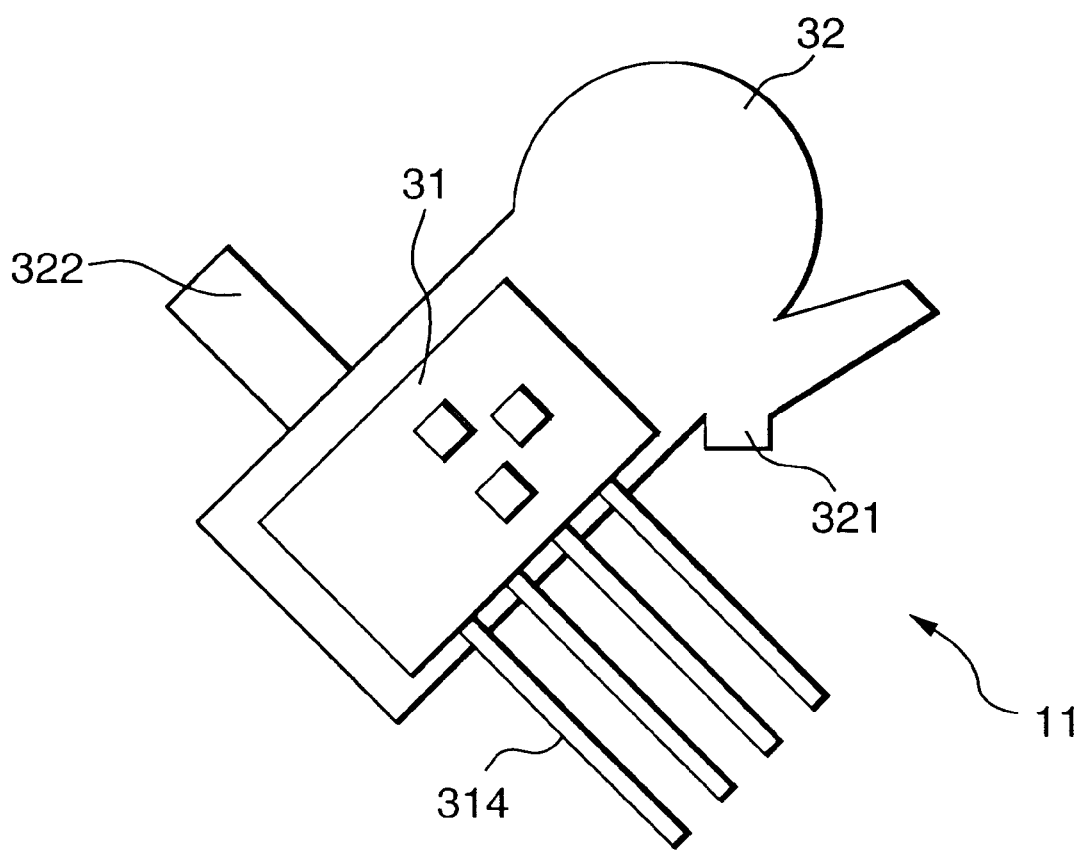
FIG. 6 is a cross-sectional view of an illumination device according to the third embodiment.
Figure 7:
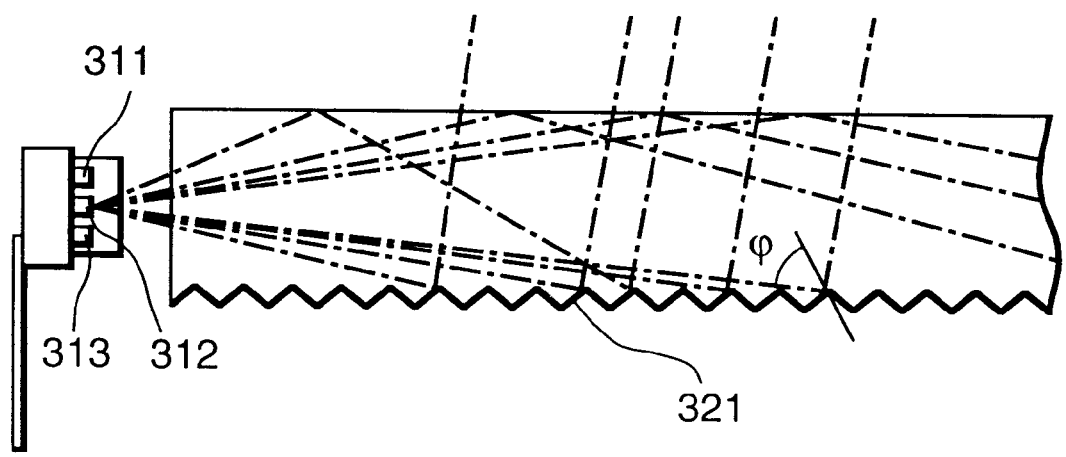
FIG. 7 is a side view of the illumination device according to the third embodiment.

FIG. 6 is a cross-sectional view of the illumination device 11, and FIG. 7 is a side view of the illumination device 11. The illumination device 11 is basically configured with an LED light source 31 packaged with a red (R) LED 311, a green (G) LED 312, and a blue (B) LED 313, and a light guide 32 made of a material, such as acrylic resin, having excellent light transmission characteristics. The wavelength of the R LED 311 at peak intensity is selected between 600 and 660 nm, that of the G LED 312 is selected between 510 and 550 nm, and that of the B LED 313 is selected between 430 to 480 nm, for realizing good color reproduction. To the LED light source 31, electric power is supplied from a power source (not shown) via a lead frame 314. Further, a projection 322 is used for determining a position of the illumination device 11 while it touches the cover glass 5 when setting the illumination device in the image sensor.

The LED light source 31 is arranged so that emitted light enters the light guide 32 from one or both ends of the light guide 32. As shown in FIG. 7, the entered light propagates inside of the light guide 32 by being fully reflected at the boundary between the air and the light guide 32, repeatedly.

Further, fine notches (notch portion 321) are formed along the length of the light guide 32, as shown in FIG. 7. When the light incidents on the notch portion 321, it is reflected at a different angle ($\psi$) from when it is reflected by other boundaries of the light guide 32. More specifically, the traveling path of the light is greatly changed toward the original (to upward in FIG. 7) when the light is reflected by the notch portion 321, thereby the incidence angle of this reflected light on the boundary between the air and the light guide 32 is less than the critical angle. In this manner, the light can be controlled to exit from the light guide 32 in the desired direction.

The notch portion 321 may be made reflective by depositing aluminum or printing with silver or white ink, or may be designed to change the light path by only utilizing characteristics of the critical angle. Alternatively, without the notch portion 321, by simply printing with white ink or roughening the surface, corresponding to the notch portion 321, of the light guide 32, for instance, similar effect of the notch portion 321 is also achieved.

In order to make the intensity of light illuminating the original image uniform, the width of notch is widened or width of the printed area, when printing with white ink, is gradually widened in proportion to the distance from the light source 31. Further, by covering a portion other than the portion where light should exit from the light guide 32 with a white member having good light reflectance, for instance, loss of light upon propagating along the light guide 32 is reduced, thereby increasing the illuminance of the original image.

Figure 8:
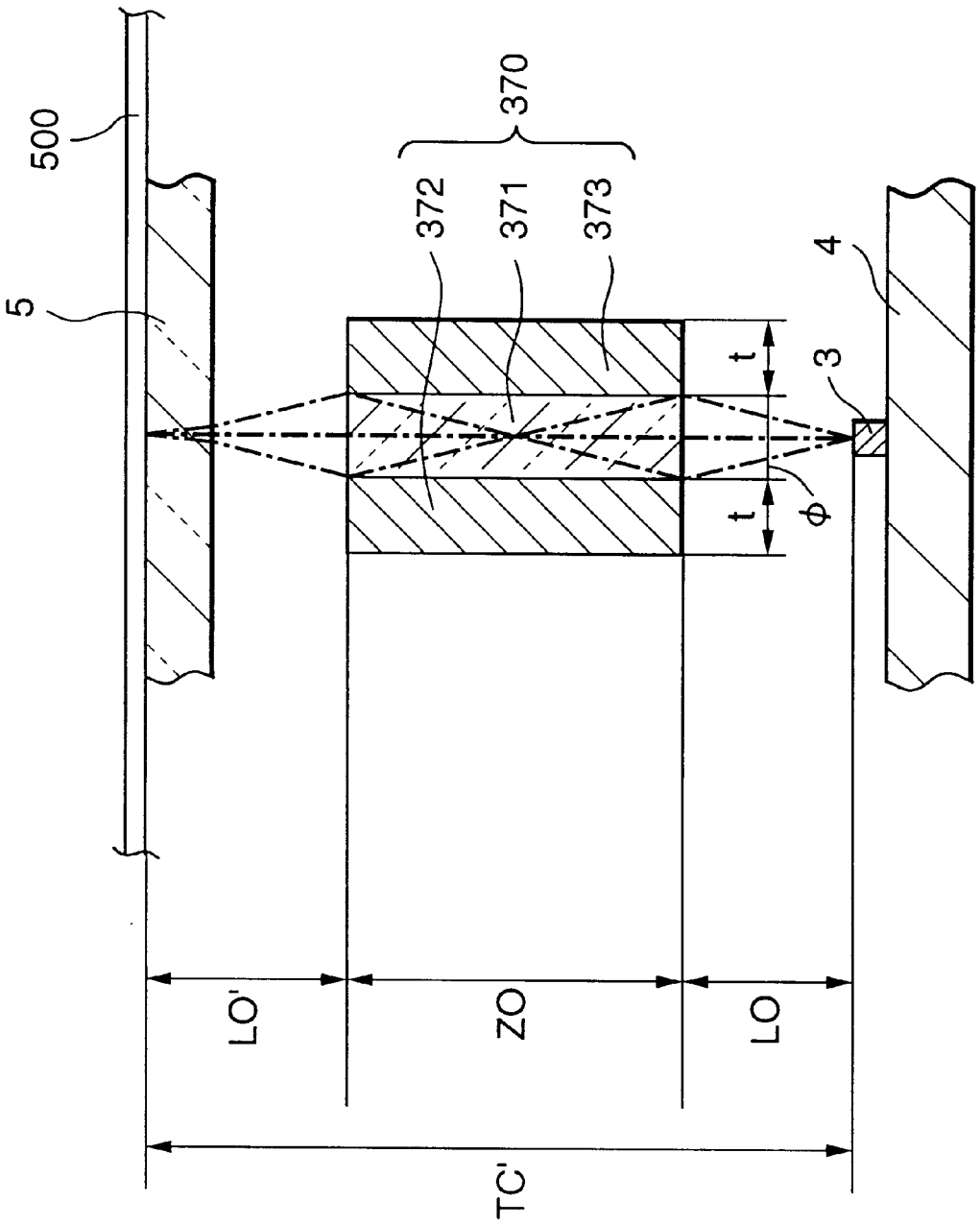
FIG. 8 shows characteristics of a lens array according to the third embodiment.

FIG. 8 is a cross-sectional view of the rod lens array 370 according to the third embodiment. Referring to FIG. 8, characteristics of the rod lens array 370 are explained. Each rod lens 371 of the lens array 370 shown in FIG. 8 has different distribution of index of refraction from that of a conventional rod lens, and the difference in index of refraction between the peripheral portion and the central portion is greater than that of the conventional rod lens. Accordingly, light entered peripheral portion of the rod lens 371 is refracted by a large angle, and the conjugate distance TC of the rod lens according to the third embodiment is about half of the conventional rod lens.

More specifically, the conjugate distance TC is 4.7 mm, the height Z0 of the lens array 370 is 2.1 mm, and the distance L0 from the end of the lens array 370 to the surface of the sensor IC 3 is 1.3 mm. The distance L0' from the other end of the lens array 370 to the original image 500 is 1.6 mm, which is little longer than L0, since there is the cover glass 5 having thickness of 1 mm and the index of refraction of 1.5.

Further, in the third embodiment, the diameter $\phi$ of each rod lens 371 configuring the lens array 370 is decreased to 0.3 mm from 0.6 mm which is the diameter of a conventional rod lens. Further, the thickness t of the side plates 372 and 373, sandwiching the rod lenses arranged in an array, is decreased to 0.3 mm from 0.5 mm which is the thickness of the conventional side plates. In the above structure, the distance between the optical axis of the lens array 370 and the outer surface of the side plate 372 or 373 is 0.45 mm, which is much shorter than that of the conventional rod lens array.

However, by reducing the diameter of each rod lens 371 and the thickness of the side plates 372 and 373, the strength of the rod lens array 370 decreases. This may cause difficulties in precisely setting optical position of the rod lens array 370 and supporting the lens array 370 by the frame 1. In order to overcome this problem, the thickness of the side plate 372, placed on the side of the illumination device 11, is reduced to 0.3 mm while maintaining the thickness of the side plate 373 at 0.5 mm, similarly to the rod lens array 170 described in the first embodiment. By configuring the rod lens array 370 as above, the thickness of the side plate on the side of the illumination device 11 is reduced while maintaining the strength of the rod lens array 370.

Figure 9:
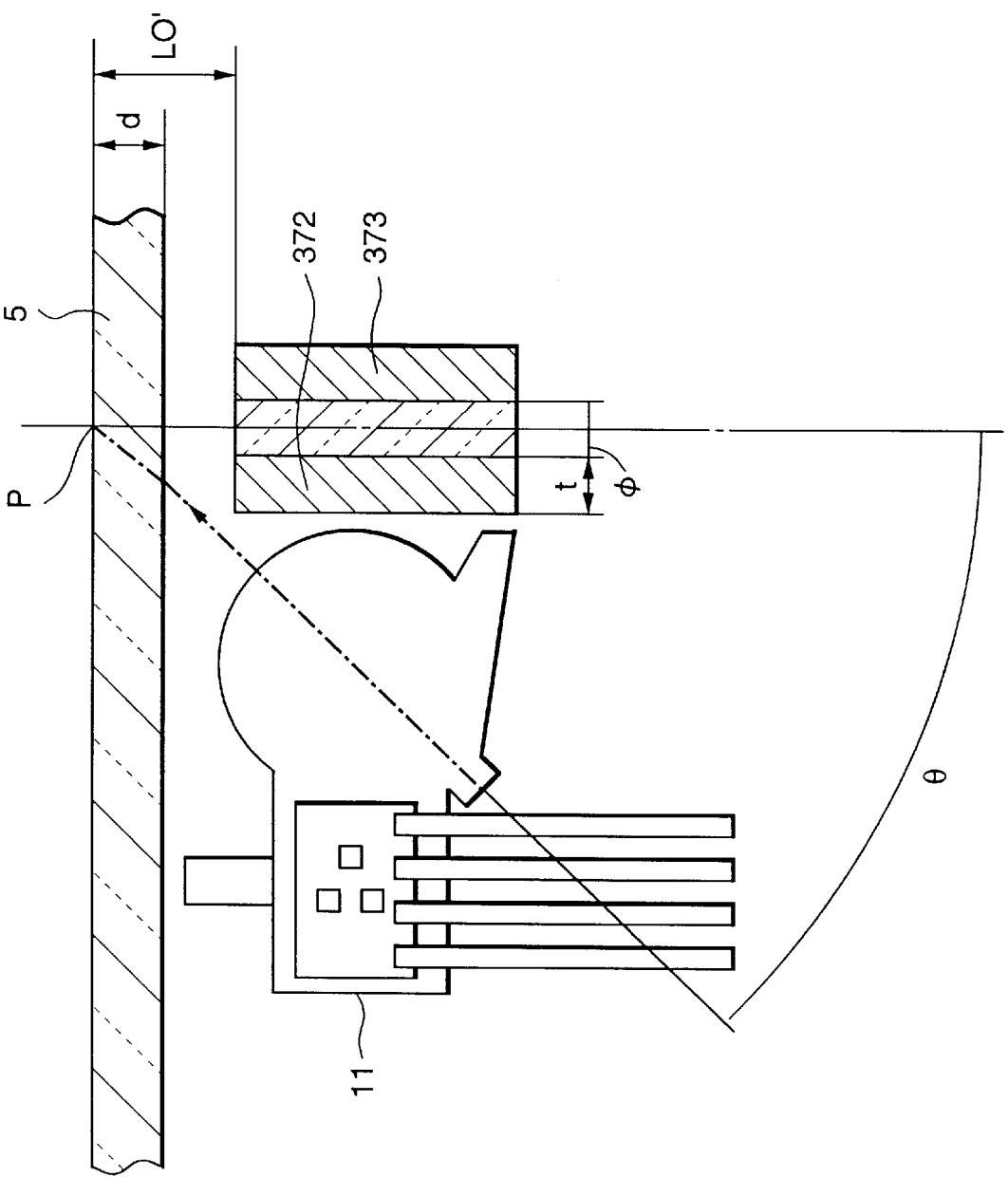
FIG. 9 shows relationship between the lens array and light emitted from the illumination device according to the third embodiment.
Figure 10:
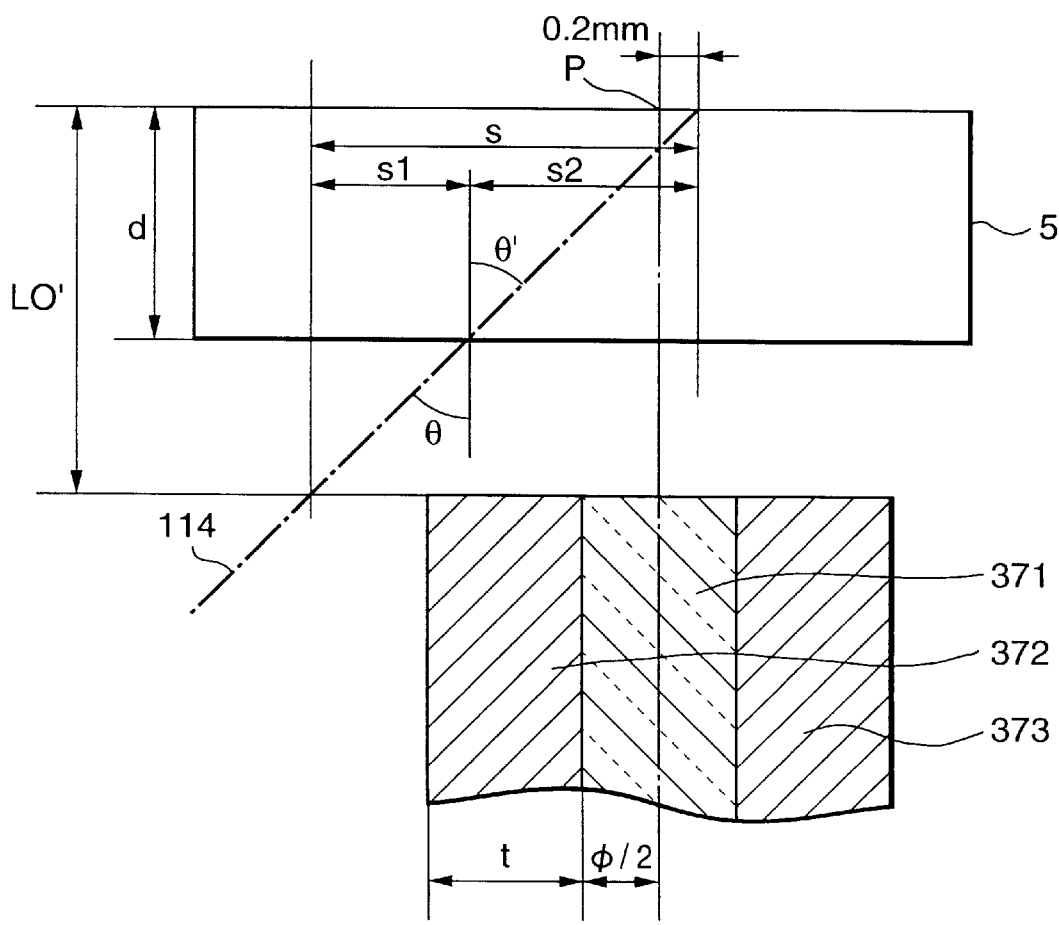
FIG. 10 is an enlarged view of a part of FIG. 9.

The relationship between the lens array 370 according to the third embodiment and the illumination light is explained in FIG. 9, and FIG. 10 shows an enlarged part of FIG. 9. Generally, with an angle $\theta$ between 30 to 50 degrees with respect to the optical axis of the lens array 370, the illumination device 11 illuminates the original. Now, let the angle $\theta$ be 30 degrees, conditions necessary to illuminate an area around the read point P by ±0.2 mm are discussed with reference to FIG. 10 while taking tolerance of mechanical configuration of the image sensor into consideration.

Referring to FIG. 10, in the space having the distance L0' between the end of the rod lens array 370 and the point P, the distance s of a traveling path in the horizontal direction of FIG. 10 of light emitted from the illumination device 11 is the sum of distance s1 before the light reaches the cover glass 5 where the light is refracted, and distance s2 in the cover glass 5. The distance s1 is obtained as a product of the distance between the end of the lens array 370 and the cover glass 5 (L0'–d, d: thickness of cover glass) and a tangent of $\theta$. Since $\theta$ is 30 degrees, $$s1 = (L0' - d) \times \tan 30° \quad (2)$$

When the light enters the cover glass 5, the traveling path is bent and the angle of refraction becomes $\theta'$. The angle $\theta'$ is described as below according to Snell's law, $$\theta' = \arcsin((\sin 30°)/n) \quad (3)$$

where n is the index of refraction of the cover glass 5. The distance s2 of the light path in the cover glass 5 is the product of the thickness d of the cover glass 5 and sine of the angle θ' in the cover glass. Since θ' is given in the above equation (3), $$s2 = d \times \tan(\arc \sin((\sin 30°)/n))  \quad (4)$$

Meanwhile, in order to surely illuminate an area around the point P by ±0.2 mm by the light, the light has to incident on a point 0.2 mm further than the point P. The distance from the side surface of the lens array 370 and the point P is φ/2+t (φ: diameter of rod lens, t: thickness of side plate), thus, $$\phi/2 + t + 0.2 \text{ mm} \leq s1 + s2  \quad (5)$$

has to be held. By substituting the equations (2) and (4) for s1 and s2 of the equation (5) and solve it, then the following equation is obtained.

$$\phi/2 + t \leq d \times \tan(\arc \sin((\sin 30°)/n)) + (L0' - d) \times \tan 30° - 0.2 \text{ mm}  \quad (6)$$

By substituting 1.6 mm for L0', 1 mm for d, and 1.5 for n, then $$\phi/2 + t \leq 0.5 \text{ mm}  \quad (7)$$

is obtained. In the third embodiment, the diameter of each rod lens 371 of the lens array 370 is decreased to 0.3 mm and the thickness of the side plate is thinned. Therefore, φ/2+t is 0.45 and the above condition determined by the equation (7) is satisfied. Accordingly, an area around the point P by ±0.2 mm is illuminated by the light emitted from the illumination device 11. Note, when the rod lenses 371 and the side plates 372 and 373 of the rod lens array 370 are fixed by adhesive, such as resin, the thickness of the adhesive should be reflected on the equations (2) to (7).

<Modification of the Third Embodiment>

Figure 11:
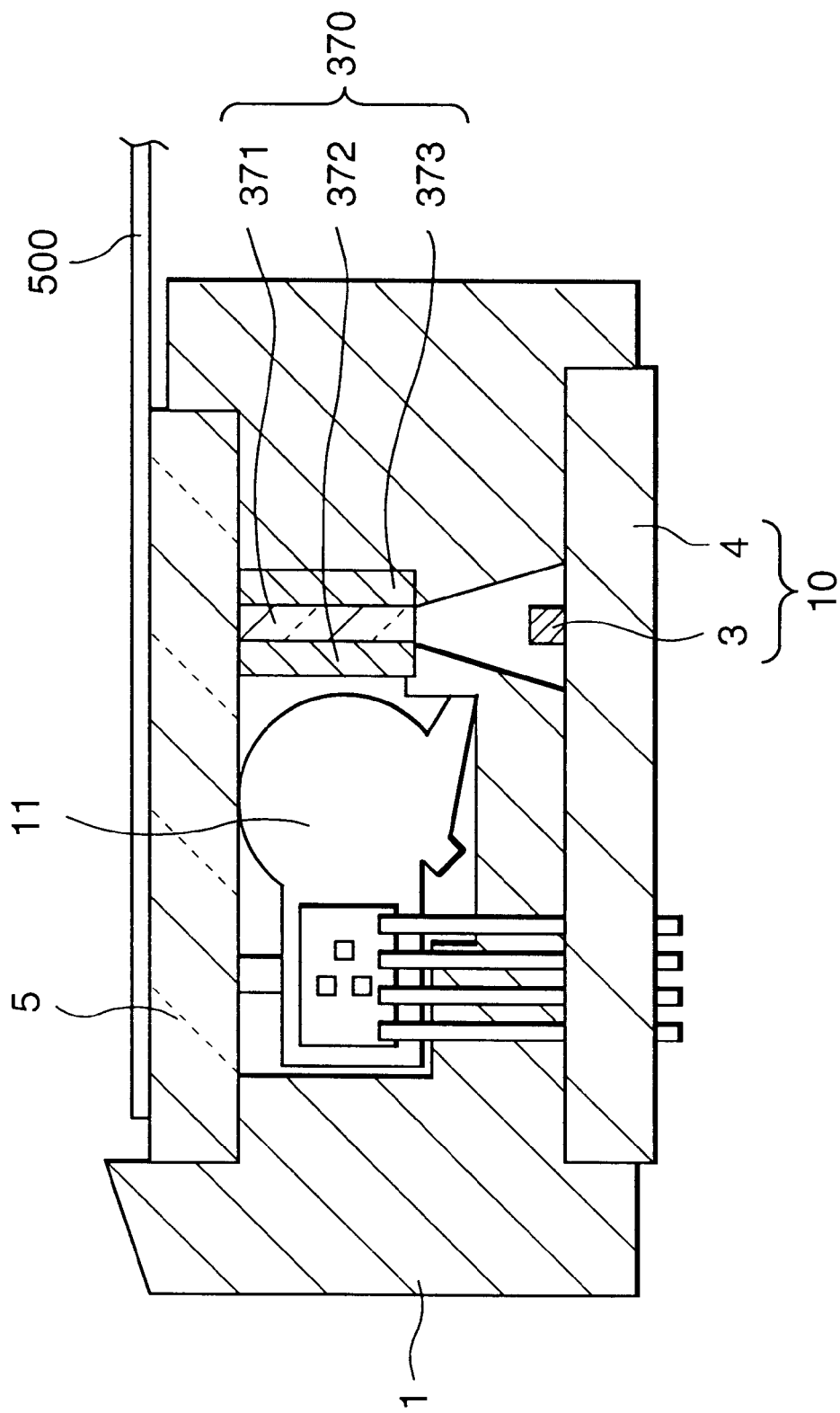
FIG. 11 is a cross-sectional view of a contact-type image sensor according to a modification of the third embodiment.

FIG. 11 is a cross-sectional view of a contact type image sensor according to the modification of the third embodiment of the present invention. Each element of the image sensor shown in FIG. 11 is basically the same as that shown in FIG. 4 except that the lens array 370 is in contact with the cover glass 5 and pressed by the cover glass 5 to be at a fixed position. With this configuration, deterioration of image due to dust on the inside surface of the cover glass 5 or the lens array 370 is prevented.

Figure 12:
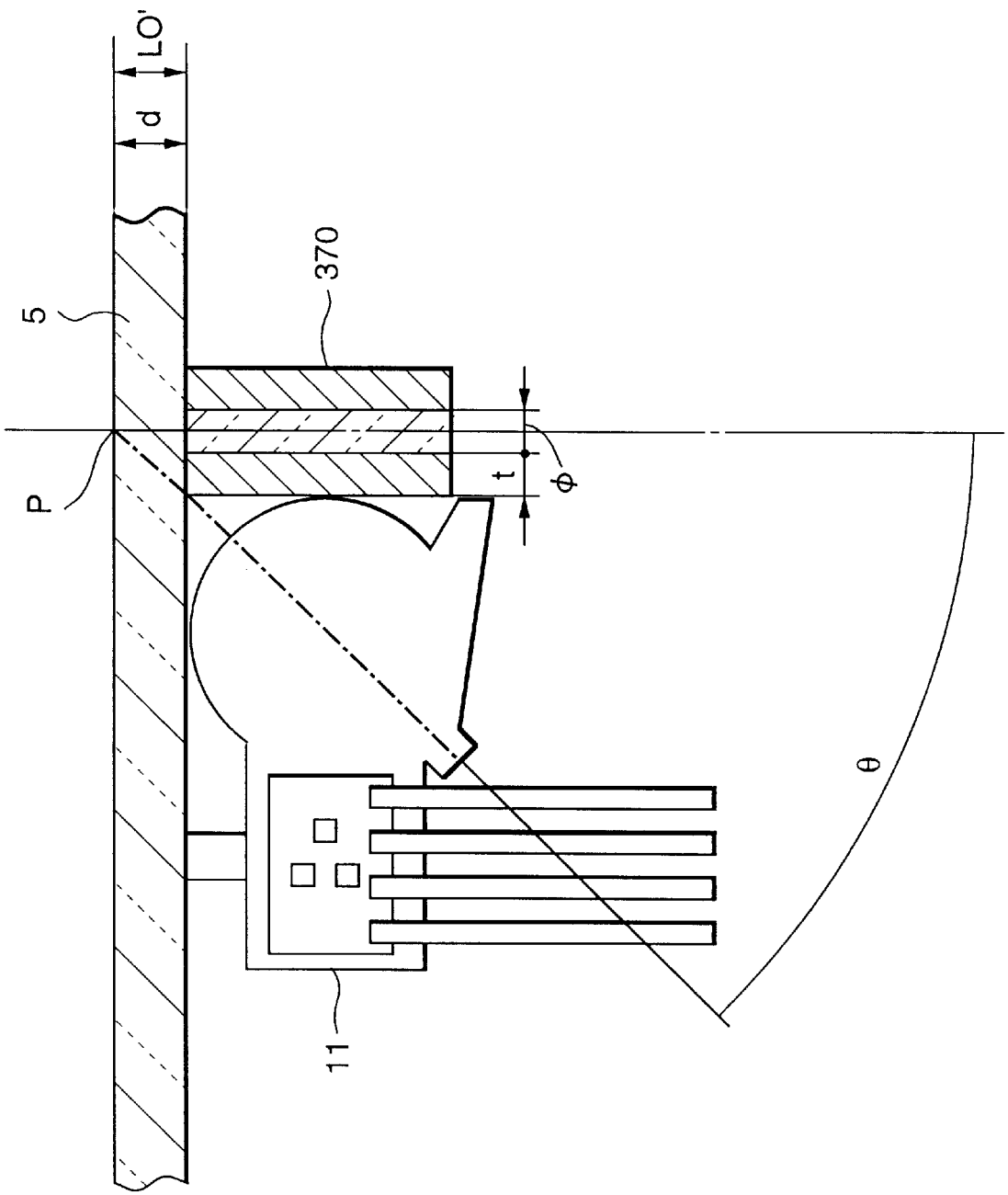
FIG. 12 shows relationship between a lens array and light emitted from an illumination device according to the modification of the third embodiment.

FIG. 12 shows relationship between the lens array 370 and illumination light emitted from the illumination device 11. The conjugate distance TC and the height Z0 of the lens array 370 and the distance L0 between the end of the lens array 370 and the sensor ICs 3 are the same as those in the third embodiment. Regarding the distance L0' from the other end of the lens array 370 and the read point P, since the cover glass 5 having the index of refraction of 1.5 fills the entire space between the end of the lens array 370 and the point P, the distance L0' is 2 mm in the modification of the third embodiment.

In order to illuminate an area around the point P by ±0.2 mm, the following equation has to be held, when d=L0'.

$$\phi/2 + t \leq L0' \times \tan(\arc \sin((\sin 30°)/n)) - 0.2 \text{ mm}  \quad (8)$$

where n is the index of refraction of the cover glass 5. Substituting 2 mm for L0', 1 mm for d, and 1.5 for n in the equation (8), then, $$\phi/2 + t \leq 0.5 \text{ mm}  \quad (9)$$

is obtained. In the modification of the third embodiment, the diameter φ of each rod lens 371 of the lens array 370 is decreased to 0.3 mm and the thickness of the side plate is thinned. Therefore, φ/2+t is 0.45 and the above condition determined by the equation (7) is satisfied. Accordingly, an area around the point P by ±0.2 mm is illuminated by the light emitted from the illumination device 11.

<Fourth embodiment>

The image sensors described in the above embodiments are applicable to image processing apparatuses. As an example, a facsimile apparatus, having communication function, is shown in FIG. 13.

Figure 13:
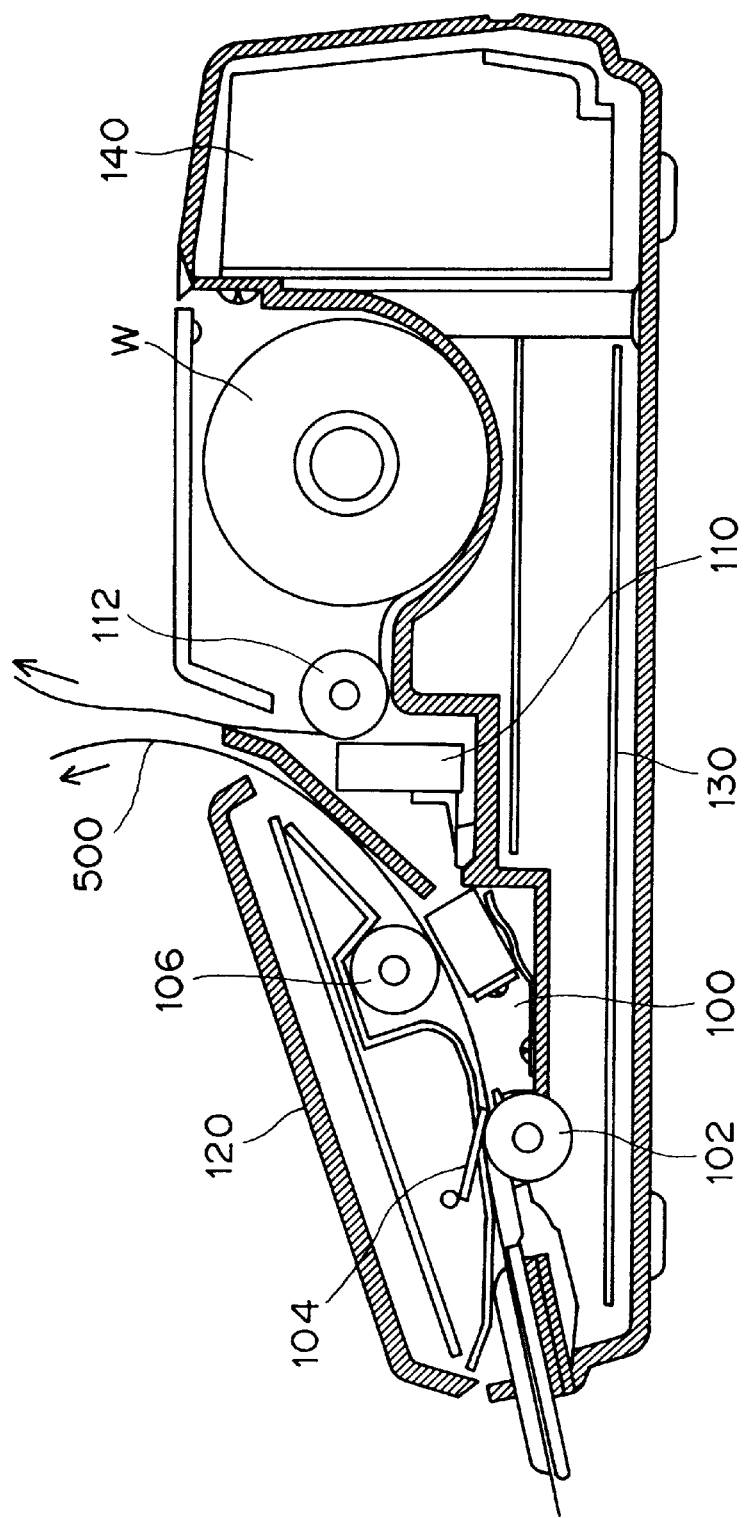
FIG. 13 is a cross-sectional view of an information processing apparatus using a contact type image sensor.

FIG. 13 is a cross-sectional view of a facsimile apparatus according to the fourth embodiment of the present invention. In FIG. 13, reference numeral 100 denotes a sensor unit configured with a contact type image sensor as described in any of the first to fourth embodiments; 102, a feeding roller for feeding the original image 500 to a reading position; 104, a separation claw for separating pages of the original image 500 to be fed one by one; and 106, a conveyance roller, provided at the reading position of the sensor unit 100, for conveying the original image 500 to pass the reading position.

Further, reference character W denotes a print medium in a form of a rolled paper on which images are printed on the basis of image information read by the sensor unit 100 or received from outside. The print medium W is not limited to a rolled paper, and may be a cut-sheet of a predetermined size. Further, reference numeral 110 denotes a printhead for printing an image on the print medium W, and a thermal head and an ink-jet printhead, for instance, may be used as the printhead 110. The printhead 110 may be of a serial type or a line type.

Reference numeral 112 denotes a platen roller for conveying the print medium W to the print position of the printhead 110 thereby controlling the print position of the print medium W; 120, switches and buttons, or an operation panel, including a display unit for displaying messages and conditions of connected apparatuses, for example, for inputting operation instructions; 130, a system control board on which a control unit for controlling respective units and elements of the facsimile apparatus, an operation circuit for operating a photoelectric conversion elements, a processing unit for processing image information, and a transmission/reception unit, are provided; and 140, a power supply for the facsimile apparatus.

Next, a basic operation of the facsimile apparatus is explained. In a case of transmitting an image, an operator sets the original image 500 at a predetermined position, and destination of transmission and transmission mode are set through the operation panel 120. After the setting is completed, the original image 500 is fed to the reading position by the feeding roller 102 and the sensor unit 100 starts reading the original image 500. At this time, the original image 500 is conveyed while being pressed against the sensor unit 100 by the conveyance roller 106. After the reading of the original image 500 is completed, or while reading the original image 500, the system control board 130, as a signal processing unit and a control unit, converts the read image into signal of a predetermined format for transmitting image data, and transmits the signal to the destination via a telephone line.

In contrast, for receiving image information from outside, the system control board 130 converts the received image information into image data of a predetermined format for printing an image on the print medium W. Image data is outputted to the printhead 110 as it is converted to the predetermined format and an image is printed on the print medium W by the printhead 110, and discharged by the platen roller 112.

Further, in the fourth embodiment, a case where reading operation is performed while moving the original image 500, however, the present invention is not limited to this, and reading operation may be performed by moving the sensor unit 100 while fixing the position of the original image 500, for example. In other words, relative position between the original image 500 and the sensor unit 100 is moved while performing reading operation.

<Fifth embodiment>

Next, the fifth embodiment is described.

In addition to the facsimile apparatus explained in the fourth embodiment, it is also possible to apply the image sensor of the present invention to an information processing apparatuses, such as an image scanner, which do not have a printhead for forming an image and transmit read image information.

In the fifth embodiment, an image read apparatus 200 installed with a contact type image sensor 200 as that described in any of the first to fourth embodiment is connected to a personal computer 150 to configure a system. In this system, read image information is transmitted to a computer or on a network.

Figure 14:
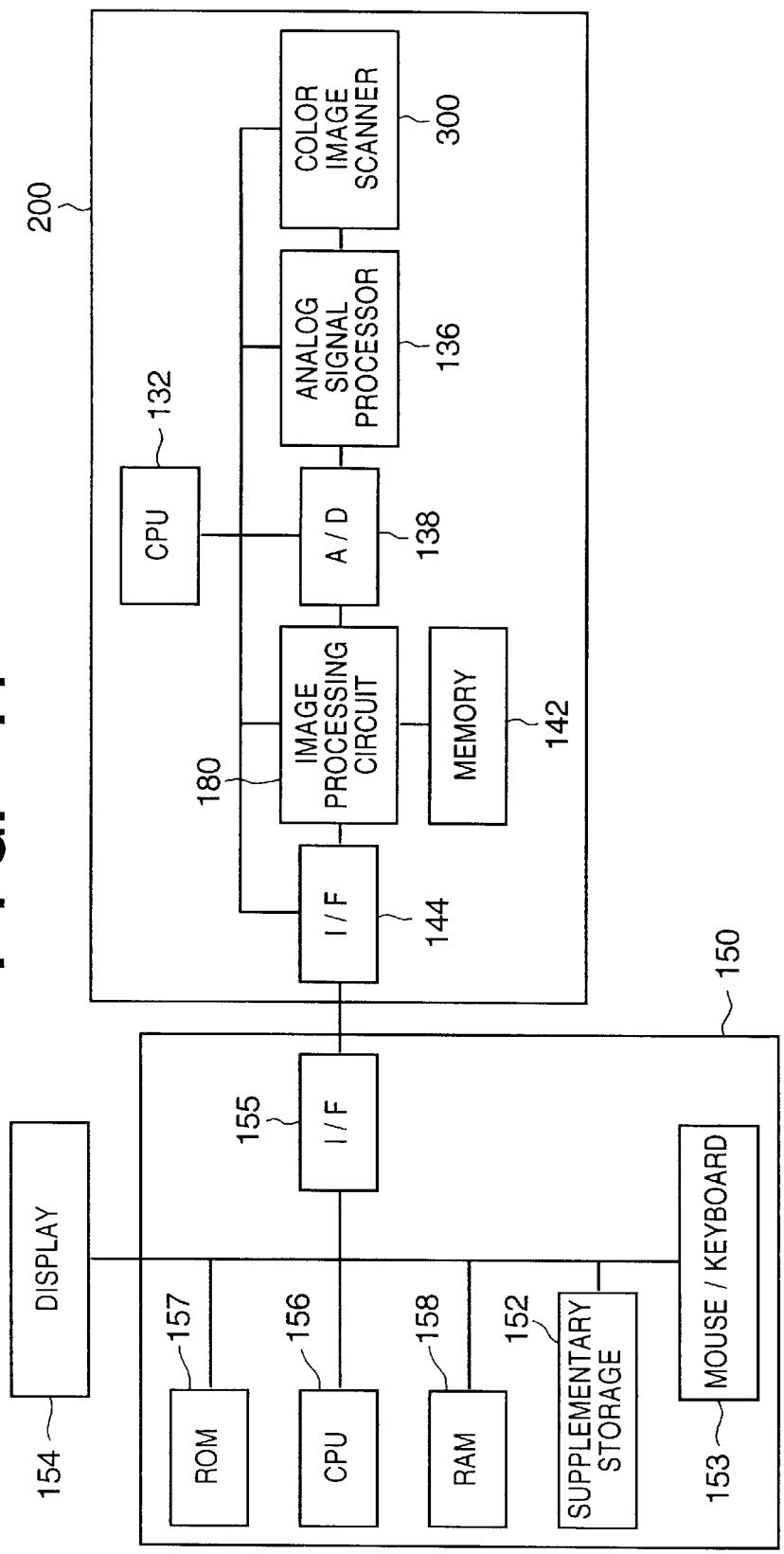
FIG. 14 is a block diagram illustrating a configuration of an image read system using a contact type image sensor.

FIG. 14 is a block diagram illustrating a configuration of an image read system using a contact type image sensor according to the fifth embodiment. In FIG. 14, reference numeral 132 denotes a CPU as a first control unit for controlling the entire image read apparatus 200; 300, a color image sensor, basically configured with a light source and a CCD line sensor, as a read unit for converting an optical image of an original into electric image signals; and 136, an analog signal processor for applying analog processes, such as gain control, to the analog image signals outputted from the color image sensor 300.

Further, reference numeral 138 denotes an analog-digital (A/D) converter for converting an output signal from the analog signal processor 136 into a digital signal; 180, an image processing circuit for applying image processes, such as shading correction, γ conversion, and variable magnification process, on the digital image signal outputted from the A/D converter 138 using memory 142; and 144, an interface for outputting digital image data processed by the image processing circuit 180 to outside of the image read apparatus 200. The interface 144 conforms to a standard, such as SCSI and Bi-Centronics, generally adopted by a personal computer, and connected to the personal computer 150. The analog signal processor 136, the A/D converter 138, the image processing circuit 180, and the memory 142 configure signal processing unit.

To the personal computer 150 as the second controller, a magneto-optical disk driver and a floppy disk driver, for example, are provided as an external storage or a supplementary storage. Reference numeral 154 denotes a display for displaying operation performed on the personal computer 150; 153, a mouse/keyboard for inputting commands and instructions to the personal computer 150; and 155, an interface for transmitting and receiving data, commands, status information of the image read apparatus 200, and other information, between the personal computer 150 and the image read apparatus 200.

An instruction for reading an image in the image read apparatus 200 is inputted to the personal computer 150 via the mouse/keyboard 153. When the read instruction is inputted using the mouse/keyboard 153, the CPU 156 transmits a read command to the image read apparatus 200 via the interface 155. Then, the personal computer 150 controls the image read apparatus 200 in accordance with control program stored in ROM 157. Note, the control program may be recorded on a recording medium, such as a magneto-optical disk or a floppy disk, to be read by the supplemental storage 152. In such cases, the control program is loaded down from the supplemental storage 152 to the personal computer 150, and the CPU 156 executes the program.

According to the first to fifth embodiments as described above, a thin and small rod lens array is realized. Further, by using the rod lens array capable of securing a traveling path of light, emitted from an illumination device, for illuminating an original, a compact and high-quality image read apparatus and image read system are realized.

The present invention is not limited to the above embodiments and various changes and modifications can be made within the spirit and scope of the present invention. Therefore to apprise the public of the scope of the present invention, the following claims are made.

What is claimed is:

1. A rod lens array, used in an image read apparatus having an illumination device for illuminating an original image and a linear image sensor for converting light from the original image into image signals and outputting the image signals, for forming the light on said linear image sensor, comprising:

a plurality of rod lenses; and first and second side plates for fixing positions of said rod lenses by sandwiching the rod lenses on both sides, wherein thickness of said first side plate is thinner than thickness of said second side plate with the illumination device being placed on the side of said first side plate.

2. The rod lens array according to claim 1, wherein a diameter φ [mm] of each of said rod lenses and the thickness t [mm] of said first side plate are determined so as to satisfy φ/2+t≦0.5 [mm].

3. The rod lens array according to claim 1, wherein said rod lenses and said first and second side plates are fixed with resin.

4. A rod lens array, used in an image read apparatus having an illumination device for illuminating an original image and a linear image sensor for converting light from the original image into image signals and outputting the image signals, for forming the light on said linear image sensor, comprising:

a plurality of rod lenses; and a side plate for fixing positions of said rod lenses, wherein said rod, lenses, arranged in an array, are fixed on only one side of said side plate and said illumination device is placed on the opposite side of said side plate with respect to said plurality of rod lenses.

5. The rod lens array according to claim 4, wherein said rod lenses and said side plate are fixed with resin.

6. An image read apparatus, comprising:

an illumination device for illuminating an original image;

a linear image sensor for converting light from the original image into image signals and outputting the image signals; and a rod lens array configured with a plurality of rod lenses, sandwiched by first and second side plates for forming the light on said linear image sensor, wherein thickness of said first side plate is thinner than thickness on said second side plate with said illumination device being placed on the side of said first side plate.

7. The image read apparatus according to claim 6, wherein a diameter φ [mm] of each of said rod lenses and the thickness t [mm] of said first side plate are determined so as to satisfy φ/2+t≦0.5 [mm].

8. The image read apparatus according to claim 6, wherein said rod lenses and said first and second side plates are fixed with resin.

9. An image read apparatus, comprising:

an illumination device for illuminating an original image;

a linear image sensor for converting light from the original image into image signals and outputting the image signals; and a rod lens array configured with a plurality of rod lenses, supported by a side plate from one side, for forming the light on said linear image sensor, wherein said illumination device is placed on the opposite side of said side plate with respect to said plurality of rod lenses.

10. The image read apparatus according to claim 9, wherein said rod lenses and s aid side plate are fixed with resin.

11. An image read apparatus comprising:

a transparent member which determines a reading position on an original image;

an illumination device for illuminating the original image;

a linear image sensor for converting light from the original image into image signals and outputting the image signals; and a rod lens array configured with a plurality of rod lenses, sandwiched by side plates, for forming the light on said linear image sensor, wherein, when a shortest distance between an edge of said rod lens array and the original image is L0 [mm], then a diameter φ [mm] of each of said rod lenses, thickness t [mm] of said side plates, an index of refraction n of said transparent member, thickness d [mm] of said transparent plate, and an incident angle θ of light emitted by said illumination device on said transparent member are determined so as to satisfy φ/2+t≦d×tan (arc sin((sin θ)/n))+(L0−d)×tan θ−0.2 [mm].

12. The image read apparatus according to claim 11, wherein φ/2+t≦0.5 [mm] holds.

13. The image read apparatus according to claim 11, wherein said rod lenses and said side plates are fixed with resin.

14. An image read system comprising:

a reading unit having:

an illumination device for illuminating an original image;

a linear image sensor for converting light from the original image into image signals and outputting the image signals; and a rod lens array configured with a plurality of rod lenses, sandwiched, parallel to the light path, by first and second side plates for forming the light on said linear image sensor wherein thickness of said first side plate is thinner than thickness of said second side plate with said illumination device being placed on the side of said first side plate, and signal processing means for applying predetermined processes on the image signals outputted from said linear image sensor.

15. The image read system according to claim 14, further comprising control means for controlling said reading unit and said signal processing means.

16. The image read system according to claim 14, wherein a diameter φ [mm] of each of said rod lenses and the thickness t [mm] of said first side plate are determined so as to satisfy φ/2+t≦0.5 [mm].

17. The image read system according to claim 14, wherein said rod lenses and said first and second side plates are fixed with resin.

18. An image read system comprising:

a reading unit having:

an illumination device for illuminating an original image;

a linear image sensor for converting light from the original image into image signals and outputting the image signals; and a rod lens array configured with a plurality of rod lenses, supported by a side plate from one side, for forming the light on said linear image sensor, and signal processing means for applying predetermined processes on the image signals outputted from said linear image sensor, wherein said illumination device is placed on the opposite side of said side plate with respect to said plurality of rod lenses.

19. The image read system according to claim 18, further comprising control means for controlling said reading unit and said signal processing means.

20. The image read system according to claim 18, wherein said rod lenses and said side plate are fixed with resin.

21. An image read system comprising:

a reading unit having:

a transparent member which determines a reading position on an original image;

an illumination device for illuminating the original image;

a linear image sensor for converting light from the original image into image signals and outputting the image signals; and a rod lens array configured with a plurality of rod lenses, sandwiched by side plates, for forming the light on said linear image sensor, and signal processing means for applying predetermined processes on the image signals outputted from said linear image sensor, wherein, when a shortest distance between an edge of said rod lens array and the original image is L0 [mm], then a diameter φ [mm] of each of said rod lenses, thickness t [mm] of said side plates, an index of refraction n of said transparent member, thickness d of said transparent plate, and an incident angle θ of light emitted by said illumination device on said transparent member are determined so as to satisfy φ/2+t≦d×tan(arc sin ((sin θ)/n))+(L0−d)×tan θ−0.2 [mm].

22. The image read system according to claim 21, further comprising control means for controlling said reading unit and said signal processing means.

23. The image read system according to claim 21, wherein φ/2+t≦0.5 [mm] holds.

24. The image read system according to claim 21, wherein said rod lenses and said side plates are fixed with resin.

* * * * *

UNITED STATES PATENT AND TRADEMARK OFFICE
CERTIFICATE OF CORRECTION

PATENT NO. : 6,239,421 B1
DATED : May 29, 2001
INVENTOR(S) : Kenji Nagata et al.

It is certified that error appears in the above-identified patent and that said Letters Patent is hereby corrected as shown below:

Column 9,
Line 32, delete "Ψ" and please insert therefore -- φ --

Column 10,
Line 64, please delete "arc sin" and insert therefor -- arcsin -- after =

Column 11,
Lines 5, 18 and 59, please delete "arc sin" and insert therfor -- arcsin --

Column 15,
Line 14, please delete "s aid" and insert therfor -- said -- after and
Line 35, please delete "arc sin" and insert therefor -- arcsin --

Column 16,
Line 49, please insert -- [mm] -- after d
Line 52, please delete "arc sin" and insert therefor -- arcsin --

Signed and Sealed this

Twelfth Day of March, 2002

Attest:

*Attesting Officer*

JAMES E. ROGAN
*Director of the United States Patent and Trademark Office*